(12) United States Patent
Stoll et al.

(10) Patent No.: US 10,726,765 B2
(45) Date of Patent: Jul. 28, 2020

(54) USING TRACKING OF DISPLAY DEVICE TO CONTROL IMAGE DISPLAY

(71) Applicant: Valve Corporation, Bellevue, WA (US)

(72) Inventors: Gordon Wayne Stoll, Sammamish, WA (US); Montgomery Vincent Goodson, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 185 days.

(21) Appl. No.: 15/897,984

(22) Filed: Feb. 15, 2018

(65) Prior Publication Data

US 2019/0251892 A1     Aug. 15, 2019

(51) Int. Cl.
*G09G 3/20* (2006.01)
*G06F 3/14* (2006.01)
(Continued)

(52) U.S. Cl.
CPC .......... *G09G 3/2096* (2013.01); *A63F 13/25* (2014.09); *G06F 3/1423* (2013.01); *G09G 3/003* (2013.01);
(Continued)

(58) Field of Classification Search
CPC ............... G09G 3/2096; G09G 3/003; G09G 2370/022; G09G 2354/00; A63F 13/25; A63F 2250/497; G06F 3/1423
See application file for complete search history.

(56) References Cited

U.S. PATENT DOCUMENTS

| | | | | |
|---|---|---|---|---|
| 5,742,264 A | * | 4/1998 | Inagaki | G02B 27/017 345/7 |
| 5,933,125 A | | 8/1999 | Fernie et al. | |

(Continued)

FOREIGN PATENT DOCUMENTS

| | | |
|---|---|---|
| EP | 3 133 468 A1 | 2/2017 |
| EP | 2 862 042 B1 | 3/2017 |

(Continued)

OTHER PUBLICATIONS

International Search Report and Written Opinion, dated Apr. 23, 2019, for International Application No. PCT/US2019/016394, 17 pages.

*Primary Examiner* — Kevin Y Kim
(74) *Attorney, Agent, or Firm* — Seed Intellectual Property Law Group LLP

(57) ABSTRACT

Techniques are described for using information from tracking position of a display device to control display of image data. The display device may, for example, be a head-mounted display ("HMD") device used for virtual reality ("VR") and/or augmented reality ("AR") display of images showing part of a simulated environment around a user wearing the HMD device, and the tracking including determining a position of the HMD device in an actual physical environment (e.g., location and/or orientation in 3D space). Operations of the HMD device or other display device and of an associated image rendering system that provides images for display is improved by determining and using information about a latency or other delay between acquiring tracking data for the device and displaying corresponding images on the device, including to initiate a safe mode operation of the device if the determined delay is too large.

24 Claims, 14 Drawing Sheets

(51) Int. Cl.
*A63F 13/25* (2014.01)
*G09G 3/00* (2006.01)

(52) U.S. Cl.
CPC .... *A63F 2250/497* (2013.01); *G09G 2354/00* (2013.01); *G09G 2370/022* (2013.01)

(56) References Cited

U.S. PATENT DOCUMENTS

| | | | |
|---|---|---|---|
| 8,659,433 | B2 | 2/2014 | Petrou |
| 8,780,014 | B2 | 7/2014 | Border et al. |
| 9,081,177 | B2 | 7/2015 | Wong et al. |
| 9,094,677 | B1 | 7/2015 | Mendis et al. |
| 9,096,920 | B1 | 8/2015 | Gomez et al. |
| 9,162,622 | B2 | 10/2015 | Szczerba et al. |
| 9,202,313 | B2 | 12/2015 | Bennet et al. |
| 9,255,813 | B2 | 2/2016 | Liu et al. |
| 9,310,884 | B2 | 4/2016 | Benson et al. |
| 9,630,105 | B2 | 4/2017 | Stafford |
| 2005/0206583 | A1 | 9/2005 | Lemelson et al. |
| 2012/0050143 | A1 | 3/2012 | Border et al. |
| 2012/0062445 | A1 | 3/2012 | Haddick et al. |
| 2012/0105473 | A1 | 5/2012 | Bar-Zeev et al. |
| 2012/0212484 | A1 | 8/2012 | Haddick et al. |
| 2014/0192084 | A1 | 7/2014 | Latta et al. |
| 2014/0361976 | A1 | 12/2014 | Osman et al. |
| 2015/0348327 | A1 | 12/2015 | Zalewski |
| 2016/0042566 | A1 | 2/2016 | Mao |
| 2016/0062459 | A1 | 3/2016 | Publicover et al. |
| 2016/0124502 | A1 | 5/2016 | Sawyer et al. |
| 2016/0214015 | A1 | 7/2016 | Osman et al. |
| 2016/0240008 | A1 | 8/2016 | Haddick et al. |
| 2016/0313790 | A1 | 10/2016 | Clement et al. |
| 2018/0093186 | A1 | 4/2018 | Black et al. |

FOREIGN PATENT DOCUMENTS

| | | |
|---|---|---|
| WO | 2012/101720 A1 | 8/2012 |
| WO | 2016/014873 A1 | 1/2016 |
| WO | 2016/014876 A1 | 1/2016 |
| WO | 2016/133886 A1 | 8/2016 |
| WO | 2018/152689 A1 | 8/2018 |
| WO | 2018/152690 A1 | 8/2018 |

\* cited by examiner

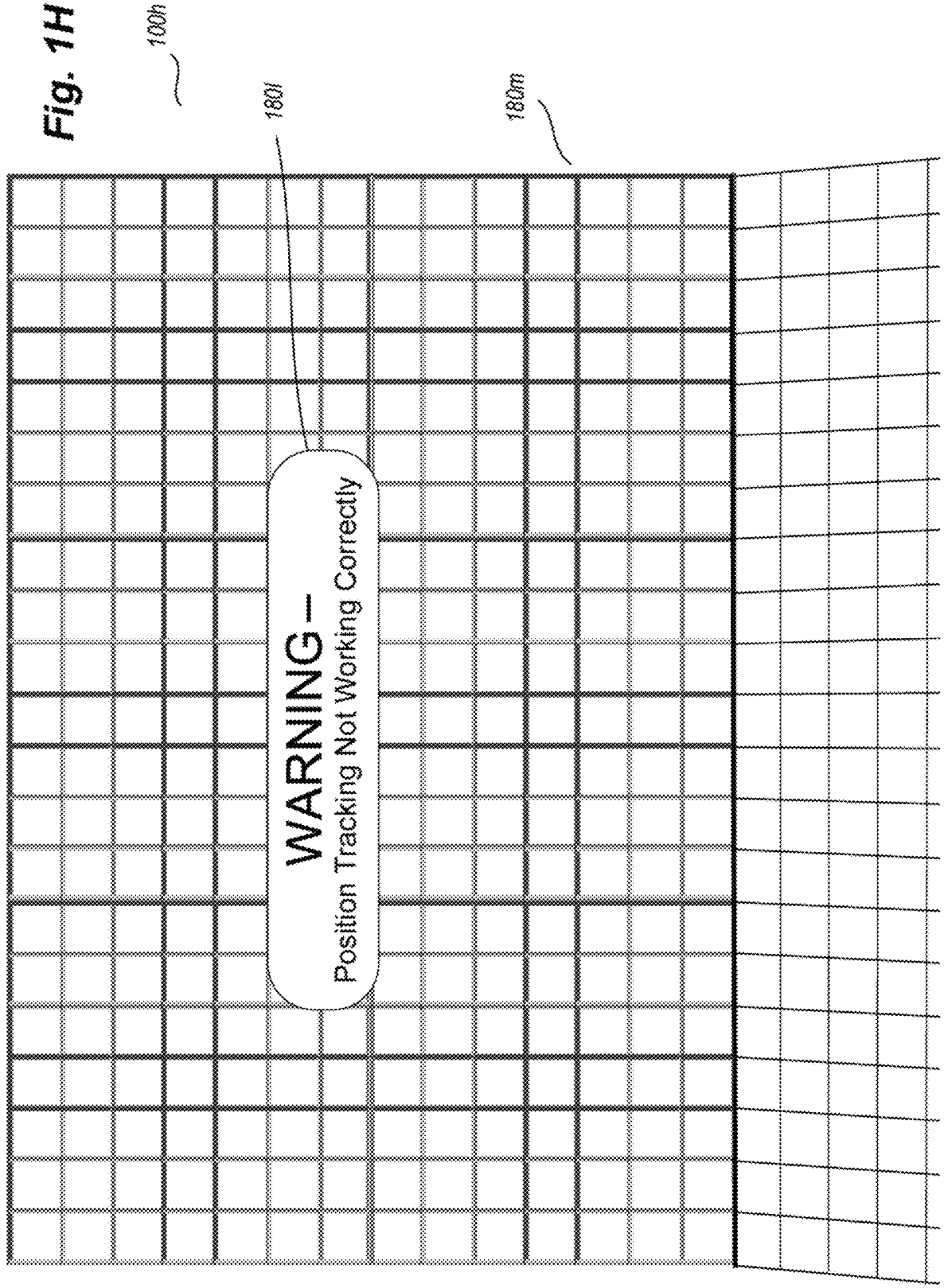

USING TRACKING OF DISPLAY DEVICE TO CONTROL IMAGE DISPLAY

TECHNICAL FIELD

The following disclosure relates generally to techniques for using information from tracking position of a display device to control display of image data on the display device, such as to use information about an amount of time from tracking a position of a head-mounted display device to control how corresponding images are displayed on the head-mounted display device.

BACKGROUND

Demand for increasing visual display resolution has resulted in large corresponding increases in image data size and associated transmission bandwidth usage. For example, higher transmission bandwidths have resulted from increasing visual display resolution in gaming devices, video display devices, mobile computing, general purpose computing, etc. In addition, the growing popularity of virtual reality ("VR") and augmented reality ("AR") systems, particularly those using head-mounted display ("HMD") devices, has further increased such demand. Virtual reality systems typically envelop a wearer's eyes completely and substitute a "virtual" reality for the actual view (or actual reality) in front of the wearer, while augmented reality systems typically provide a semi-transparent or transparent overlay of one or more screens in front of a wearer's eyes such that an actual view is augmented with additional information.

However, the generation of images for such HMD devices and the timing of their display to coordinate with a surrounding physical environment has increased issues involved in the use of such devices.

BRIEF DESCRIPTION OF THE DRAWINGS

FIGS. 1A-1I illustrate examples of use of at least some techniques described in the present disclosure in an example environment and situation.

DETAILED DESCRIPTION

Figure 1A:
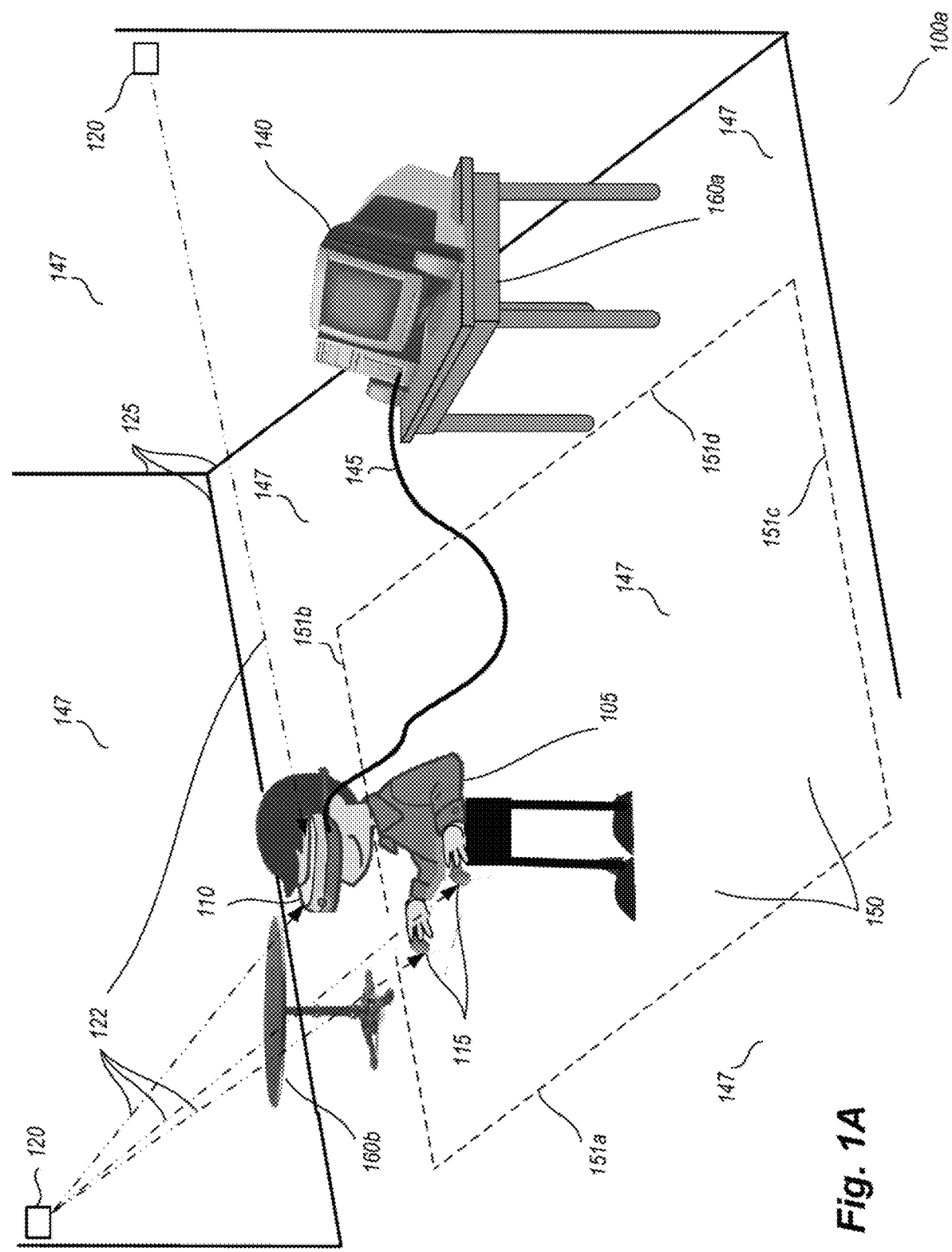

The present disclosure relates generally to techniques for using information from tracking a display device to control display of image data on the display device. In at least some embodiments, the display device is a head-mounted display ("HMD") device used for VR and/or AR display of images provided by an image rendering system, such as to generate and present images that are wholly or in part of a simulated environment rather than an actual physical environment around a user wearing the HMD device, and the tracking of the HMD device includes determining a position of the HMD device (e.g., a location in three-dimensional space and/or an orientation of the HMD device) in the actual physical environment. For example, a tracked position of an HMD device or other display device may be used to determine one or more images to display on the device, such as to determine a view of a subset of a simulated environment that surrounds the user in whole or in part to be displayed to the user to correspond to the tracked position, and to change the view as the device position changes—however, if the use of the tracking data results in images being displayed that do not actually correspond to the position of the device at the time of display (e.g., due to a sufficiently long delay between when the tracking data is acquired and when a resulting image is displayed), the performance of the display system may suffer, including to potentially place the user and/or device at risk of injury (e.g., when the user with an HMD device is moving around the physical environment and is approaching physical impediments in the environment that are not reflected in VR images displayed on the HMD device).

Accordingly, in at least some embodiments, the operation of the HMD device or other display device and of an associated image rendering system that provides the images for display is improved by determining and using information about a latency or other delay between acquiring position tracking data for the device and displaying corresponding images on the device. In particular, if the determined delay is too large (e.g., exceeds a defined threshold or otherwise satisfies one or more defined criteria), the HMD device or other display device enters a safe mode operation in at least some embodiments, such as to replace images of the simulated environment displayed on the device with other images that identify a potential problem to the user, and/or to otherwise notify the user of the potential problem. In addition, the determined delay information may be used in at least some embodiments to improve the images of the simulated environment that are provided to the device for display, whether in addition to or instead of using the determined delay information to initiate safe mode operations, such as to allow the image rendering system to predict a future position of the device for a future time, which differs from a time of acquiring tracking data about a current position of the device by an amount that corresponds to the determined delay, and to generate and provide images for display on the device that correspond to the predicted future position at the future time. Some or all of the techniques described herein may be performed via automated operations of embodiments of a Tracking-based Display Manager ("TDM") system, as discussed in greater detail below.

The tracking of the position of an HMD device or other display device may be performed in various manners in various embodiments, including in some embodiments to occur in whole or in part by information provided from the HMD device or other display device (e.g., via IMUs, or inertial measurement units, that provide accelerometers and/or gyroscopes and/or magnetometers; via GPS or other sensors that receive signals from external devices and use the signals to determine position information; etc.), and in some embodiments to occur in whole or in part by information provided from one or more other devices external to the HMD device or other display device (e.g., motion sensors, cameras, etc.). The location and/or orientation for the tracked position information may further be determined in various manners in various embodiments, including relative to one or more other objects or reference points (e.g., a fixed point in an actual physical environment in which a user is moving) and/or in an absolute manner (e.g., via use of the GPS coordinate system). As one non-limiting example, a physical environment (e.g., a 15 foot by 15 foot area of a room) in which the HMD device or other display device is located may include one or more hardware devices (referred to at times as "base stations") that repeatedly (e.g., 60 times a second) transmit an infrared flash followed by a rotating infrared laser, with the HMD device or other display device including various photo sensors (e.g., tens or hundreds of photo sensors) that detect the infrared flash and use an amount of subsequent time until particular photo sensors detect the laser light to determine a 3D location and orientation in the physical environment with a high degree of accuracy (e.g., a millimeter or less). Furthermore, in some embodiments the tracking of the position of an HMD device or other display device may in some embodiments include tracking one or more points or other locations on the device, such as a marker or tracker used by external device(s) to determine the position, by one or more sensors on the display device that determine the position, etc. In other embodiments, the tracking of the position of an HMD device or other display device may be based in part or in whole by tracking one or more other proximate objects that are associated with the device, such as one or more points or other locations on a body of a user of the device (e.g., the user's head), and/or one or more points or other locations for one or more other associated devices (e.g., input/output devices used by the user, such as handheld controllers; sensors or other devices worn or carried by the user or attached to objects worn or carried by the user; etc.). Additional details related to obtaining and using position tracking information are included below.

The images to be displayed on the HMD device or other display device based on a tracked position of the device may have various forms in various embodiments, and may be generated or otherwise determined or selected in various manners. For example, in at least some embodiments, an image rendering system generates images that correspond to a view of a subset of a simulated environment around the HMD device or other display device, such as by generating a succession of images that are video frames (e.g., at a rate of 30, or 60, or 90, etc. frames per second)—such an image rendering system may be, for example, part of a gaming system in which the user participates in (e.g., interacts with) a game that the simulated environment represents. Such an image may include a number of pixel values, and may be encoded in various forms for transmission to the HMD device or other display device, such as to include one or more types of metadata in the image (e.g., in a header) or to otherwise transmit such metadata in associated with the image, to optionally compress the image, etc. As one specific example, the image may be encoded to include or otherwise have associated timing information about a time that is associated with the generating or other determination or selection of the image, such as a time at which a corresponding tracked position is determined, a time at which the image is generated or otherwise determined to reflect that corresponding tracked position, a future time after the generating or other determining of the image that corresponds to a future estimated position of the HMD device or other display device reflected in the image, etc. In other embodiments, the associated information encoded in or otherwise included with an image may include positioning information about an actual (e.g., current) and/or estimated future tracked position of the HMD device or other display device to which the image corresponds, whether instead of or in addition to the timing information. In addition, as used herein, a "pixel" refers to the smallest addressable image element of a display that may be activated to provide all possible color values for that display, with a pixel in many cases including individual respective sub-elements (in some cases as separate "sub-pixels") for separately producing red, green, and blue light for perception by a human viewer, and with a pixel "value" as used herein referring to a data value corresponding to respective levels of stimulation for one or more of those respective RGB elements of a single pixel.

In addition, the safe mode operations of an HMD device or other display device (e.g., smart phone or other handheld device) may be implemented in various manners. For example, in some embodiments, a textual and/or other (e.g., auditory, tactile, etc.) warning is provided to the user, such as to prompt the user to stop moving and/or to remove the HMD device or otherwise stop using the display device. In addition, in some embodiments, one or more alternative images may be displayed to the user on the HMD device or other display device to provide information about a position of the user in a surrounding actual physical environment, whether instead of or in addition to providing a warning, and in at least some embodiments to replace one or other images that are provided for display on the device based on tracked position information—such alternative images may include, for example, images of the surrounding actual physical environment (e.g., from a front-facing camera on the HMD device or other display device) and/or a virtual view of the surrounding actual physical environment (e.g., a grid to show the boundaries of portions of a physical area within the surrounding actual physical environment in which the user is intended to move, optionally with representations of one or more physical objects in the surrounding actual physical environment, such as objects outside the physical area but near one or more of its boundaries). Furthermore, the image rendering system may also be notified in at least some embodiments to pause or terminate operations involved in generating images of the simulated environment, and the HMD device may optionally be prepared for imminent collision in some embodiments. In addition, after safe mode operations have been initiated for an HMD device or other display device, the safe mode may be ended in various manners in various embodiments, such as after a defined amount of time, after the user manually indicates to do so (e.g., by restarting or resetting the display device and/or image rendering system), after additional images of a simulated environment are received that do not have sufficient associated delay or otherwise trigger criteria associated with initiating safe mode operations, etc. Additional details related to implementing safe mode operations are included below.

Furthermore, benefits in at least some embodiments of the described techniques include improving the operation of an HMD device or other display device and of an associated image rendering system that provides images for display, including to minimize or eliminate damage to the device and/or its user based at least in part on using information about a delay that is determined between acquiring position tracking data for the device and displaying corresponding images on the device, such as by minimizing collisions of the device and/or user with physical objects in the surrounding actual physical environment. Also, by acquiring and using more accurate actual delay information, the generation or other determination or selection of images to display may also be improved, including for systems that estimate a future position of the device at the time of image display and/or that estimate the future time of that image display— such accurate actual delay information may further allow the image rendering system to operate more efficiently (e.g., by using less processing power and time to attempt to determine a future time of display to which one or more images correspond), may allow more accurate images be generated (e.g., to better reflect the position of the HMD device or other display device at the time of display), etc.

For illustrative purposes, some embodiments are described below in which various specific details are included for illustrative purposes, and in some cases some embodiments are simplified for the sake of brevity so as to not illustrate well-known components. As one non-exclusive example, in some embodiments, particular types of device tracking techniques, hardware sensors, display devices (e.g., HMD devices) and display panels (e.g., using OLED, or organic light-emitting diodes; using LCD, or liquid crystal displays; etc.) and optical lenses, input/output devices, etc. are used and structured in particular manners (e.g., with the hardware sensors being part of the display device) and are used in particular manners for particular uses (e.g., for virtual reality and/or augmented reality), including to use particular types of techniques as part of controlling operations of an HMD device. As another example, in some embodiments the devices that are tracked and whose position is used to generate or otherwise select corresponding position-based images are used by one or more human users. However, it will be appreciated that the inventive techniques may be used in a wide variety of other situations, some of which are discussed herein, including with other types of display devices and device tracking techniques, and/or with devices that are not used by a human, and that the invention is thus not limited to the exemplary details provided. In addition, various details are provided in the drawings and text for exemplary purposes, but are not intended to limit the scope of the invention.

Figure 1B:
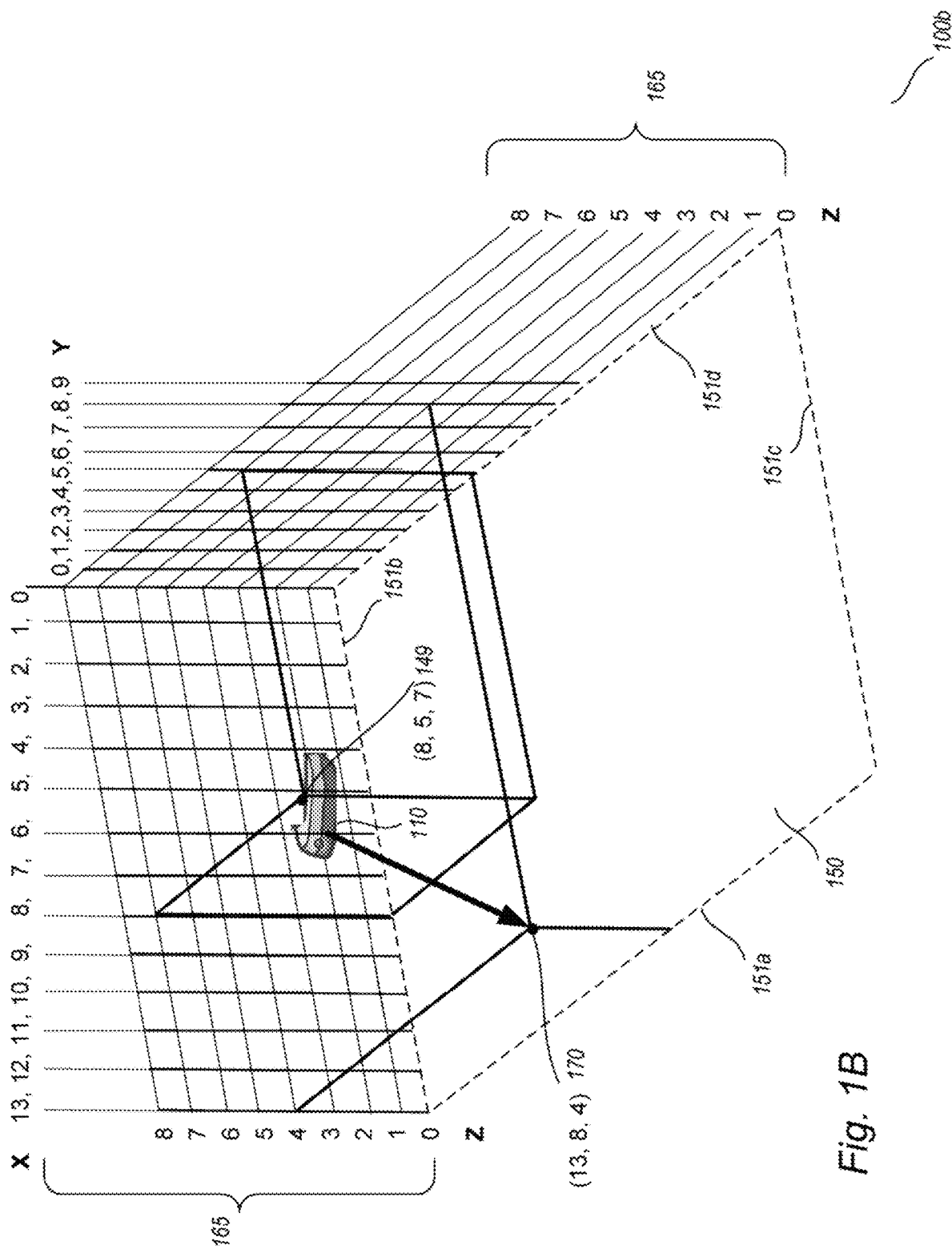
Figure 1C:
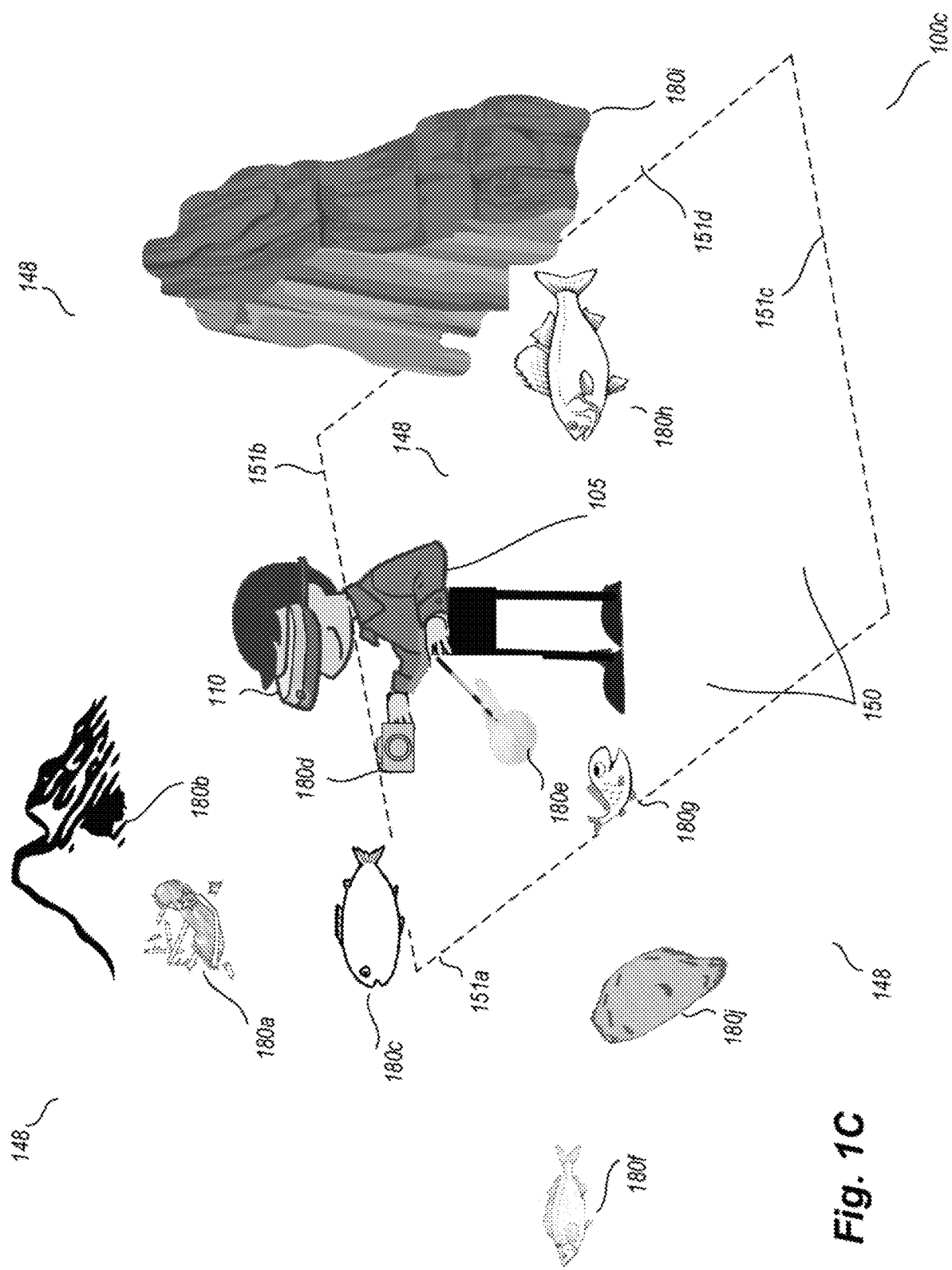
Figure 1D:
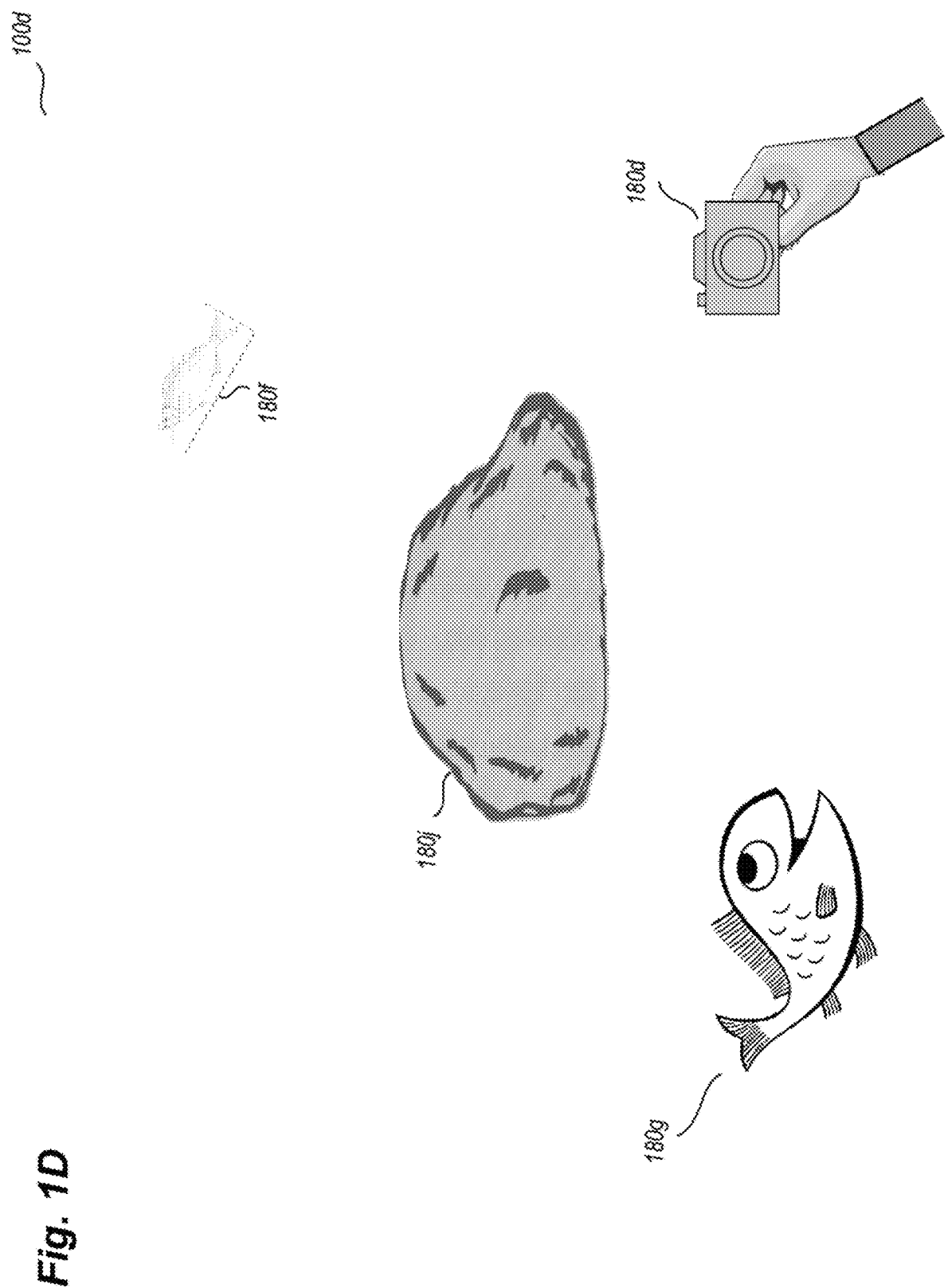
Figure 1E:
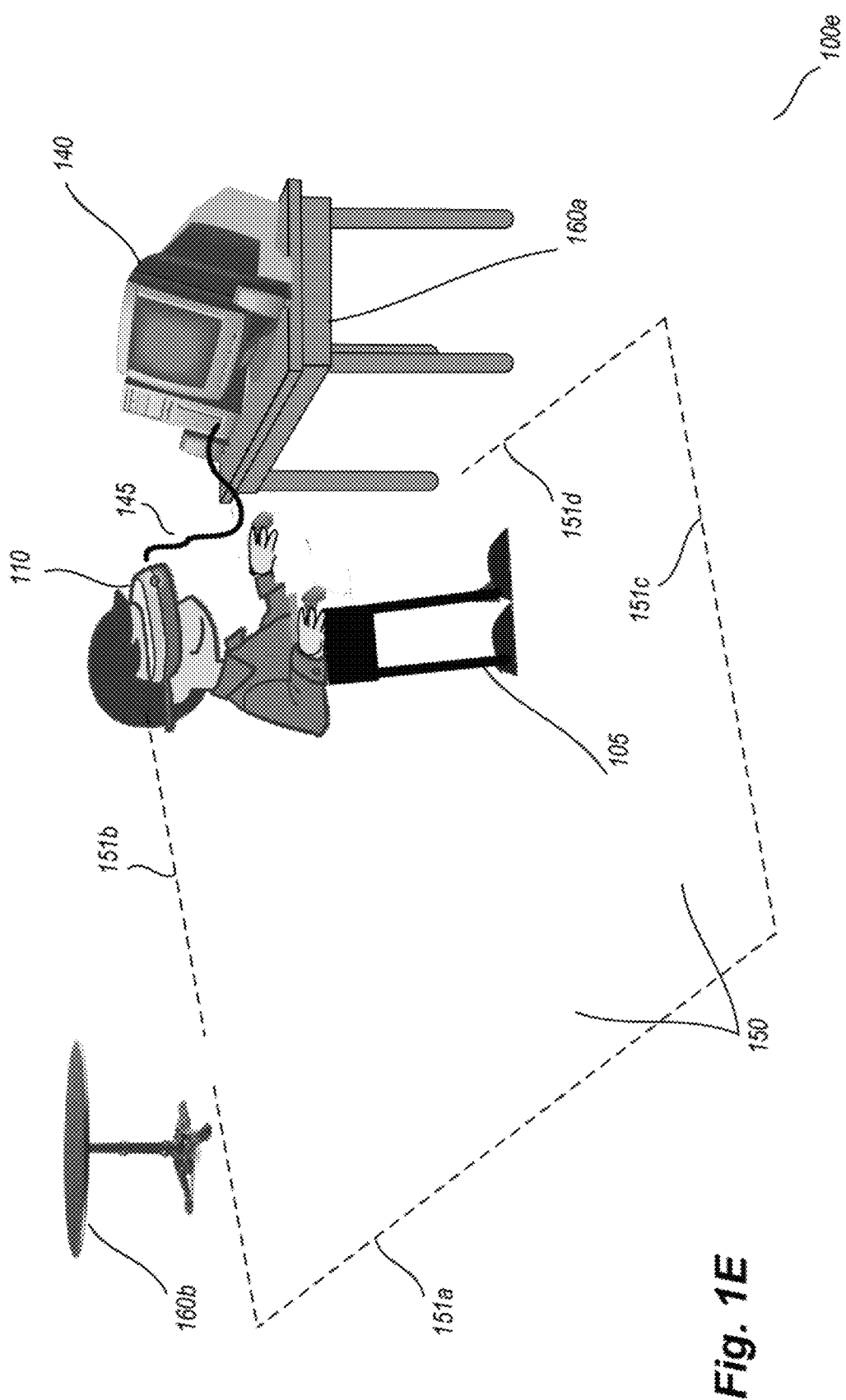
Figure 1F:
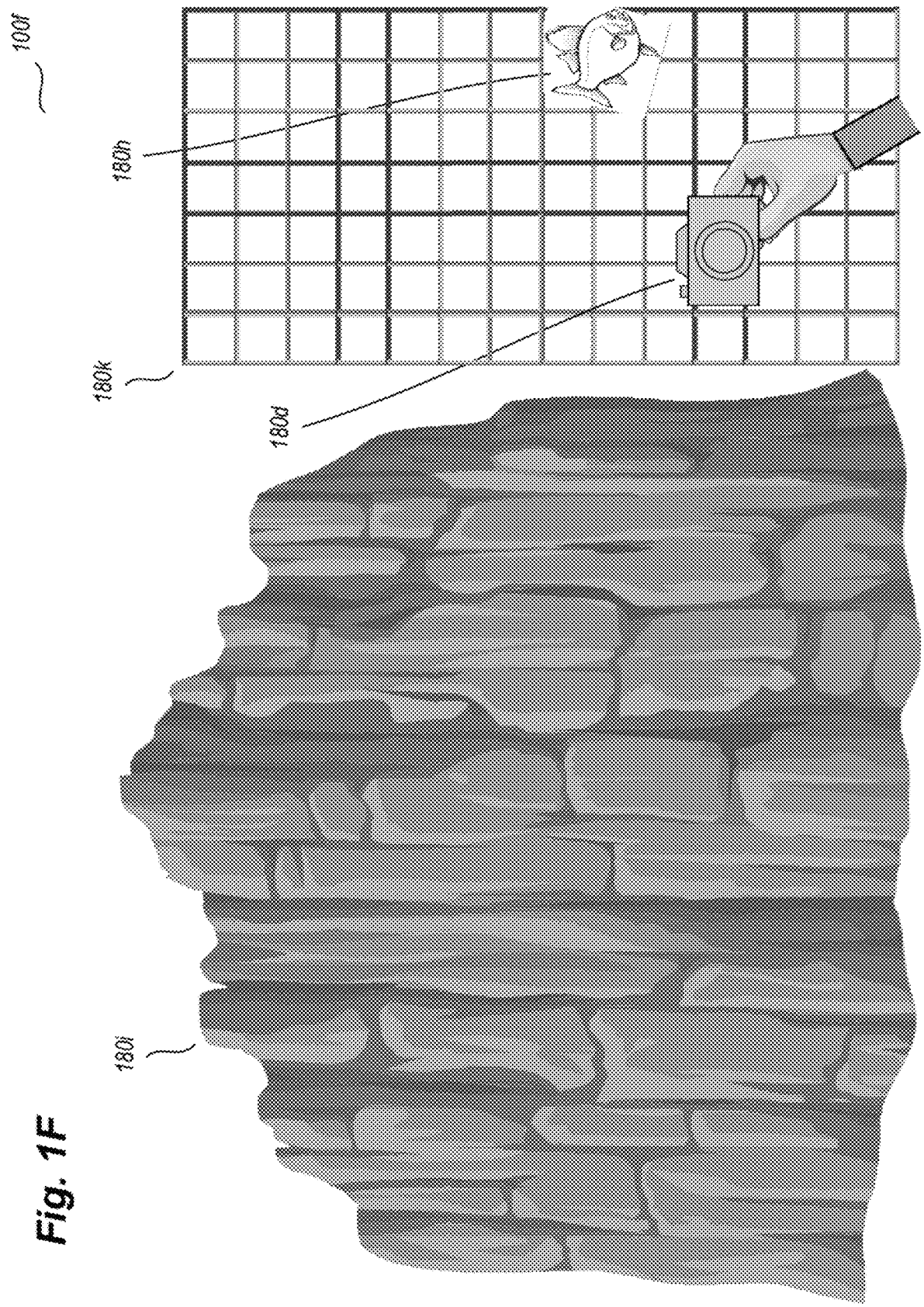
Figure 1G:
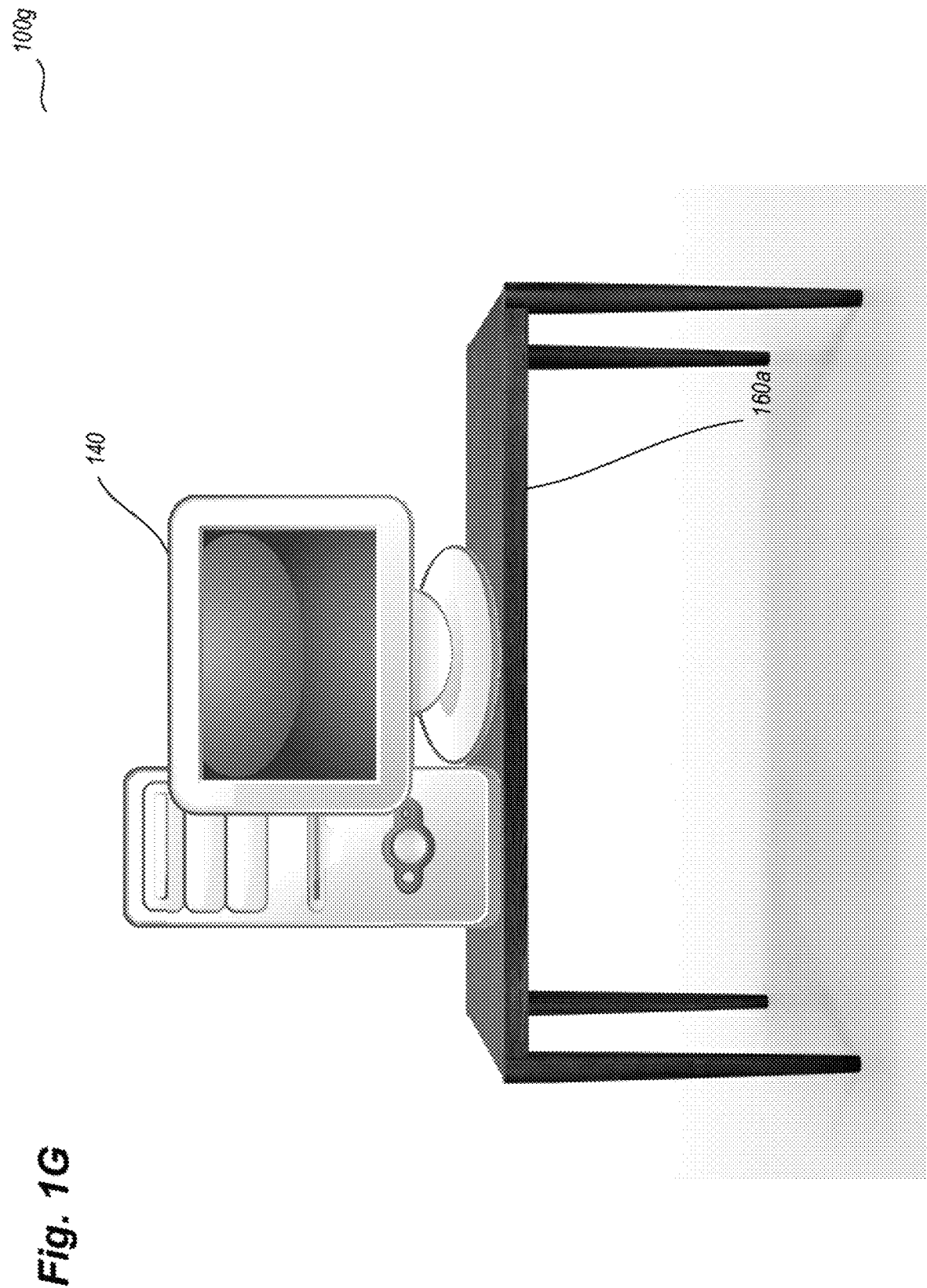
Figure 1I:
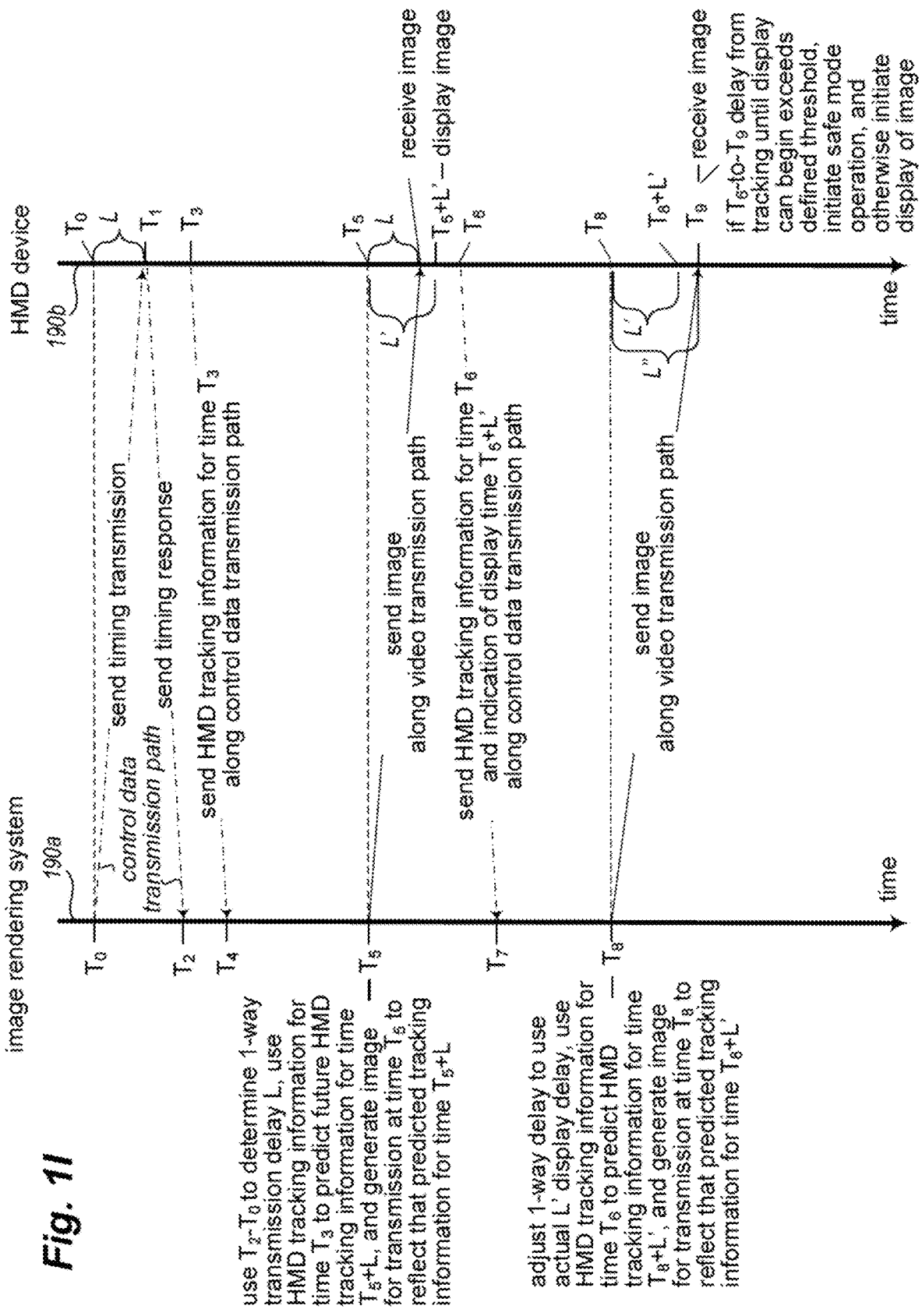

FIGS. 1A-1H illustrate examples of use of at least some techniques described in the present disclosure in an example environment and situation, and FIG. 1I illustrates examples of information exchange and use of timing information in such an example environment. In particular, in the example of FIG. 1A, a human user 105 is present in an actual physical environment 147, which in this example is a room of a building (a portion of which is shown with corners 125), as shown in view 100a. The user is wearing an HMD device 110, via which the user may receive displayed information of a simulated environment different from the actual physical environment, as discussed in greater detail with respect to FIGS. 1C-1D and 1F. In the illustrated embodiment, the HMD device 110 is connected to a computing system 140 via a cable 145 (also referred to as a "tether"), although in other embodiments the HMD device may perform some or all interactions with computing system 140 via a wireless connection (not shown)—in this example, the computing system 140 acts as an image rendering system that supplies images of the simulated environment to the HMD device for display to the user. The user 105 is further able to move around the actual physical environment, and in this example is expected to stay within an area 150 that is a subset of the physical environment (with boundaries 151a, 151b, 151c and 151d), such as to avoid running into obstacles in the actual physical environment, such as table 160a or end table 160b. The user 105 in this example further may have one or more I/O ("input/output") devices to allow the user to further interact with the simulated environment, which in this example includes hand-held controllers 115.

As the user moves location within the area 150 and/or changes orientation of the HMD device 110, the position of the HMD device is tracked, such as to allow a corresponding portion of the simulated environment to be displayed to the user on the HMD device, as discussed in greater detail with respect to FIGS. 1C-1D and 1F. In some embodiments, the tracking of the position of the HMD device 110 may be performed in part or in whole by the HMD device itself, with the tracking being further assisted by one or more external devices in this example. In particular, the external devices in the example of FIG. 1A include two base stations 120 that emit signals 122 (e.g., light pulses) that the HMD device 110 detects and uses to determine the position of the HMD device, although in other embodiments the one or more external sensors may instead perform the tracking in other manners. In this example, the controllers 115 may further employ similar techniques to use in tracking the positions of the controllers (and to optionally use that information to assist in determining and/or verifying the position of the HMD device), although in other embodiments the controllers may not be tracked in that manner and/or other devices/sensors (not shown) on or near the user may be similarly tracked. After the tracked position of the HMD device 110 is known for a particular time based on such tracking, corresponding information is transmitted to the computing system 140 via the cable 145, which uses the tracked position information to generate one or more next images of the simulated environment to display to the user 105. In addition, while not illustrated here, such external devices and/or the HMD device (e.g., via an external camera) may obtain information about actual physical objects in the actual physical environment, such as for use in later generating of an artificial version of the actual physical environment as discussed with respect to FIG. 1H.

FIG. 1I illustrates examples of information exchange and use of timing information in such an example environment. In particular, actions of an example image rendering system (e.g., the computing system 140 of FIG. 1A) are illustrated along a first timeline 190a of FIG. 1I, and actions of an example HMD device (e.g., the HMD device 110 of FIG. 1A) are illustrated along a second timeline 190b of FIG. 1I. As noted above with respect to FIG. 1A, the HMD device may send information at times to the image rendering system along a control data transmission path between the HMD device and the image rendering system, as illustrated in FIG. 1I in a transmission initiated by the HMD device at time $T_3$, with the tracking information reflecting the location and orientation of HMD device at time $T_3$, such as for use by the image rendering system in generating views of the simulated environment around the user corresponding to that tracking information—in other embodiments, the image rendering system may itself determine tracking information for the HMD device (e.g., using sensors external to the HMD device), and if so such a tracking information transmission at time $T_3$ (and a similar later tracking information transmission at time $T_6$ along the control data transmission path) may not be performed.

As further illustrated in FIG. 1I, the image rendering system may determine information about a latency or other delay between sending information from the image rendering system to the HMD device and subsequent display of that information by the HMD device in various manners in various embodiments. In some embodiments, the image rendering system may send specialized timing transmissions along the control data transmission path (e.g., one or more timing packets that do not include any image data, in a manner analogous to a 'ping' command) to which the HMD device immediately responds along the control data transmission path with a corresponding timing response, such as to allow the image rendering system to measure the roundtrip latency or other delay for sending information from the image rendering system to the HMD device and receiving response information along the control data transmission path, from which the image rendering system may estimate a 1-way latency or other delay (e.g., based in part on half of the roundtrip time, or to otherwise adjust the 1-way time determination if the upload and download speeds between the image rendering system and HMD device are different, and optionally to use the control data transmission path latency as an initial estimate for latency along a separate video data transmission path). Examples of such a timing transmission and response are shown by the timing transmission sent at time $T_0$ from the image rendering system and the timing response received at time $T_2$ from the HMD device—if so, the image rendering system may initially determine the 1-way latency or other delay to be L based in part on the difference between times $T_0$ and $T_2$. The image rendering system may further alter such an initial estimated delay time L in some embodiments to reflect an additional estimated amount of time between the receipt by the HMD device of an image along the video data transmission path and the subsequent display of the image, although such an adjustment is not illustrated in the example of FIG. 1I using the initial delay time L.

In other embodiments, the image rendering system may determine the 1-way latency or other delay in other manners, whether in addition to or instead of the use of such timing transmissions and responses. For example, as illustrated in FIG. 1I, the image rendering system may transmit an image to the HMD device at time $T_5$ along the video data transmission path and the HMD device may subsequently display the image at time $T_5+L'$, with $L'$ representing a measured actual 1-way latency or other delay for that image from the time of image transmission until the time of image delay—if so, the HMD device may provide information about that time $T_5+L'$ of image display back to the image rendering system for subsequent use, as illustrated in the information transmission from the HMD device at time $T_6$ along the control data transmission path that also includes tracking information for that time $T_6$ of the transmission.

The image rendering system may further use tracking information for the HMD and information about the 1-way latency or other delay information as part of generating an image to be displayed. For example, as illustrated for the image generated by the image rendering system and transmitted at time $T_5$, the image rendering system takes the most recent tracking information, determines a difference in time from when the tracking information was generated until a future time at which the image is expected to be displayed (based in part on the determined 1-way latency or other delay information), predicts future tracking information for that future time, and generates the image to correspond to that predicted future tracking information. Thus, for example, the image generated and transmitted by the image rendering system at time $T_5$ is generated to reflect a future time of $T_5+L$. Similarly, the image generated and transmitted by the image rendering system at time $T_8$ is generated to reflect a future time of $T_8+L'$, using the revised 1-way latency or other delay value of $L'$ received by the image rendering system at time $T_7$. The prediction of such future tracking information may be performed in various manners, such as to use a previous rate of change of the user's movement and to estimate a future location and orientation if that rate of change continues, to use increasing or decreasing acceleration in the previous rate of change of the user's movement to estimate the future location and orientation, etc. With respect to the image transmitted at time $T_8$ that is generated to reflect a future time of $T_8+L'$, FIG. 1I further illustrates that the actual receipt of the image by the HMD device is delayed a longer time L", and if the delay from at least time $T_6$ (when the most recent tracking information is generated) to time $T_9$ (when the resulting image to be displayed using that tracking information is received), and optionally to further include an amount of time between $T_9$ and when the corresponding image display would begin as part of the delay that is considered, exceeds a defined threshold time, the HMD device will initiate safe mode operation rather than displaying the image, as discussed further with respect to FIGS. 1B-1H.

Figure 2A:
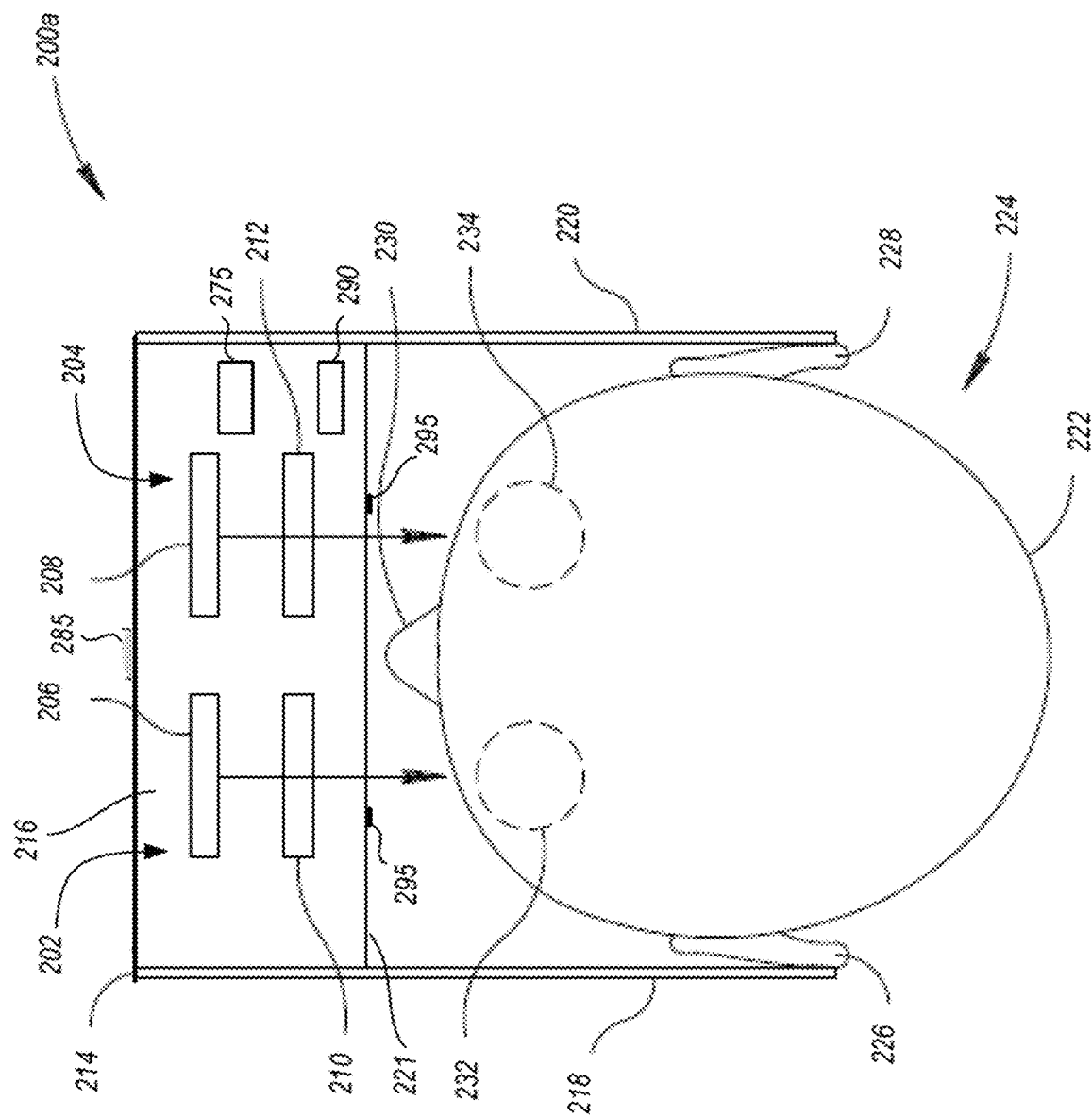
FIG. 2A illustrates a top plan view of an HMD device that includes binocular display panels according to an example embodiment of the present disclosure.

FIG. 1B continues the example of FIG. 1A, but illustrates a view 100b of the area 150 and the HMD device 110 without illustrating various other objects in the actual physical environment 155 that are shown in FIG. 1A. Instead, a virtual grid 165 is illustrated in FIG. 1B, which in this example includes an X axis from roughly right-to-left, a Y axis from roughly far-to-near, and a Z axis for the vertical down-to-up axis, with a 0, 0, 0 location associated with the floor of the room in the farthest displayed corner. As is shown, the tracking of the position of the HMD device 110 may include determining x, y, z location information at one or more particular points at a given time (which in this example includes the 8, 5, 7 position, corresponding roughly to the top center of the HMD device), although it will be appreciated that location may be tracked in other manners in other embodiments, and that a number of different points or locations may be simultaneously tracked and used together to determine the HMD device position (e.g., as part of determining an orientation of the HMD device). In addition to tracking the location on the HMD device 110 in three dimensions, the tracked position of the HMD device further includes a tracked orientation of the HMD device in this example, as visually illustrated in this example by the directional ray pointing to a location 170 where the direction of the user's gaze departs the rectangular enclosure space for the space 150 (in this example, location 13, 8, 4). As previously noted, in some embodiments the tracked location and orientation may be determined by the HMD device based on information it receives from external devices such as the base stations 120 (FIG. 1A), although in other embodiments, some or all of the information (e.g., orientation information) may be based at least in part on the information generated by the HMD device itself (e.g., via one or more inertial measurement units, not shown in this example)—additional details related to an example HMD device are shown in FIG. 2A. It will be appreciated that a user who moves throughout the area 150 may have a tracked position that is changing constantly, and the tracking of the position may be repeatedly performed (e.g., numerous times per second, such as 60 times per second), optionally once for each image to be displayed to the user on the HMD device.

FIG. 1C provides an example of a view 100c of a simple simulated environment 148 that virtually surrounds the user, such as with various simulated objects 180 illustrated in this example (e.g., simulated rocks 180b, 180i and 180j; simulated fish 180c, 180f, 180g and 180h; a simulated shipwreck 180a; simulated objects 180d and 180e held by the user and able to interact with the simulated environment in various manners; etc.). It will be appreciated that a single image displayed on the HMD device may illustrate only a view of a small portion of the simulated environment in this example, since the simulated environment surrounds the user while the displayed image in this example is not a 360° wrap-around image (although in other embodiments the images supplied and/or simulated environment may have other forms). Furthermore, as the user moves the position of the HMD device, the use of the tracked position information will further cause the images provided for display to change to reflect the changed tracked position.

Continuing this example, FIG. 1D illustrates a view 100*d* of an image that may be displayed to the user on the HMD device based on a current position of the HMD device, as discussed above with respect to FIGS. 1B and 1C. In this example, the image based on the current tracked HMD position includes visual representations of simulated objects 180*d*, 180*f*, 180*g* and 180*j*, but not other simulated objects illustrated in FIG. 1C that do not correspond to the current tracked position, and also does not include information in this example about the actual physical environment (e.g., the tables 160, walls, etc.), although in other embodiments the displayed image may include both information from simulated and actual physical environments simultaneously.

FIG. 1E illustrates a further view 100*e* in this example as the user moves within the area 150—in particular, in this example, the user has turned and is near the boundary 151*d* of the area 150, with actual physical objects 160*a* and 140 immediately in front of the user. If the user is seeing only the simulated environment, it would be appropriate to provide notifications (e.g., as part of the displayed images and/or separate from the displayed images) to warn the user of approaching the boundary and/or the actual physical objects, as discussed further with respect to FIG. 1F. However, such notifications are based on accurately tracking the HMD device position and quickly using that information (e.g., by the image rendering system) as part of the images provided for display (or other notifications information that is provided to the HMD device for use). Thus, if sufficient delays occur between when the position is tracked and when a corresponding generated image is later displayed to the user on the HMD device, problems may result, including possible injury to the user and/or HMD device and/or objects in the actual physical environment if the user continues to move and impacts one or more objects in the actual physical environment past the boundary before the corresponding image or other warning notification is provided to and displayed on the HMD device.

FIG. 1F illustrates a further view 100*f* of the simulated environment that may be presented to the user at the location of FIG. 1E if the new position of the HMD device is tracked and used without delay to provide a corresponding image for display. In this example, the imminent boundary 151*d* may be illustrated to the user in various ways, such as by a simulated object that is placed at or near the boundary (such as rock wall 180*i*) and/or by a virtually added barrier that is placed at or near the boundary (such as grid 180*k*). Other simulated objects 180*d* and 180*h* are also illustrated.

However, if the delay is too large (e.g., exceeds a defined threshold) between when the user moves as shown in FIG. 1E and corresponding tracked position information is used to generate new images for display, the images on the HMD device for the location of FIG. 1E may not reflect the image of FIG. 1F, and may still continue to be an example similar to that of FIG. 1D. If so, the user may be unaware of the imminent departure from the area 150 and collision with objects in the actual physical environment.

Accordingly, FIG. 1G illustrates one example of use of the described techniques to assist in protecting the user and other physical objects by implementing safe mode operation for the HMD device, and in particular illustrates a view 100*g* of a replacement image to be displayed in place of one or more images of the simulated environment that would otherwise be shown (e.g., as shown in FIG. 1C). In this example, the replacement image reflects video or other image information of the actual physical environment, such as by using a forward-facing camera on the exterior of the HMD device to show a view of what the user would see if the HMD device was not being worn by the user. In this manner, the user can immediately see that he or she is near or at the boundary 151*d* and by physical objects 160*a* and 140, in order to prevent further movement in that direction. In other embodiments, the HMD device may include a mechanism to allow a user to see forward without the use of a forward-facing camera or removal of the HMD device, such as by having moveable shutters that otherwise block a forward view until moved.

FIG. 1H illustrates a view 100*h* of an alternative embodiment of implementing safe mode operation for the HMD device, and in particular in which a virtual view of the actual physical environment is generated and displayed to the user on the HMD device instead of an image of the simulated environment or a view of the actual physical environment as shown in FIG. 1G. In particular, in the example of FIG. 1H, the modified image includes a grid floor and wall 180*m* without other information about the simulated environment—in other embodiments, virtual representations may be shown of one or more actual objects in the actual physical environment (e.g., of objects 160*a* and/or 140), whether in addition to or instead of the virtual grid. FIG. 1H further illustrates a warning message 180*l* related to the safe-mode operation of the HMD device, such as to indicate that position tracking is not working correctly so that the user can appreciate that normal operation has been paused or terminated—while not shown in FIG. 1G, one or more such warning messages may similarly be used in such embodiments. It will also be appreciated that various other types of information from the actual environment and/or other types of warning information may be displayed or provided to the user. In addition, while not illustrated in this example, the safe-mode operation of FIGS. 1G and/or 1H may be supplemented with other types of warning information, such as audible tones, tactile information (e.g., vibrations), etc., and the computing system 140 and its image rendering system may further be notified to pause operation involved in generating images of the simulated environment. In at least some embodiments, some or all of the virtual view of the actual physical environment is generated locally on the HMD device before it is displayed, such as to assist in minimizing the delay in producing the display (e.g., to prevent the user from feeling sick), to assist in showing the floor and/or other elements in the actual physical environment (e.g., walls) at the correct orientation, etc.

FIG. 2A is a simplified top plan view of an HMD device 200*a* that includes a pair of near-to-eye display systems 202 and 204, such as may be used in the examples of FIGS. 1A-1I or otherwise used with the described techniques. The near-to-eye display systems 202 and 204 include display panels 206 and 208, respectively (e.g., OLED or LCD micro-displays), and respective optical lens systems 210 and 212 that each have one or more optical lenses. The display systems 202 and 204 may be mounted to frame 214, which includes a front portion 216, a left temple 218, right temple 220 and interior surface 221 that touches or is adjacent to a face of a wearer user 224 when the HMD device is worn by the user. The two display systems 202 and 204 may be secured to the frame 214 in an eye glasses arrangement which can be worn on the head 222 of the wearer user 224. The left temple 218 and right temple 220 may rest over the user's ears 226 and 228, respectively, while a nose assembly (not shown) of the interior surface 221 may rest over the user's nose 230. The frame 214 may be shaped and sized to position each of the two optical systems 210 and 212 in front of one of the user's eyes 232 and 234, respectively. Although the frame 214 is shown in a simplified manner similar to eyeglasses for explanatory purposes, it should be appreciated that in practice more sophisticated structures (e.g., goggles, integrated headband, helmet, straps, etc.) may be used to support and position the displays systems 202 and 204 on the head 222 of user 224.

The HMD device 200a of FIG. 2A is capable of presenting a virtual reality display to the user 224, such as via corresponding video presented at a display rate (e.g., 30, 60, 90, etc. frames or images per second), while other embodiments of a similar system may present an augmented reality display to the user 224 in a similar manner. Each of the displays 206 and 208 may generate light which is transmitted through and focused by the respective optical systems 210 and 212 onto the eyes 232 and 234, respectively, of the user 124. While not illustrated here, each of the eyes will typically include a pupil aperture through which light passes into the eye—the pupil (and enclosing iris) may typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 224 as images and/or video.

In the illustrated embodiment, the HMD device 200a further includes hardware sensors and additional components that may be used by disclosed embodiments as part of the described techniques for identifying conditions to trigger safe-mode operations and/or for implementing safe-mode operations. The hardware sensors in this example include one or more accelerometers and/or gyroscopes 290 (e.g., as part of one or more IMU units)—as discussed in greater detail elsewhere herein, values from the accelerometer(s) and/or gyroscopes may be used to locally determine an orientation of the HMD device. In addition, the HMD device 200a may include one or more front-facing cameras, such as camera(s) 285 on the exterior of the front portion 216, and whose information may be used during safe-mode operations to replace images of a simulated environment with images of the actual physical environment in front of the HMD device (or more generally may be used as part of other operations of the HMD device, such as for providing AR functionality). The hardware sensors in the illustrated embodiment further include one or more sensors or other components 295 for tracking the user's pupil/gaze, such as located on the interior surface 221 near the optical lens systems 210 and 212—as discussed in greater detail elsewhere herein, information from the components 295 may be used to identify a particular view of a simulated environment to display to the user, such as based on a direction of the user's gaze in combination with other information about a position (e.g., location and orientation) of the HMD device. Furthermore, the HMD device 200a may further include other components 275 (e.g., internal storage, one or more batteries, position tracking devices to interact with external base stations, etc.), as discussed in greater detail elsewhere herein. Other embodiments may not include one or more of the components 275, 285, 290 and/or 295. While not illustrated here, some embodiments of such an HMD may include various additional internal and/or external sensors, such as to track various other types of movements and position of the user's body, etc.

While the described techniques may be used in some embodiments with a display system similar to that illustrated in FIG. 2A, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

Figure 2B:
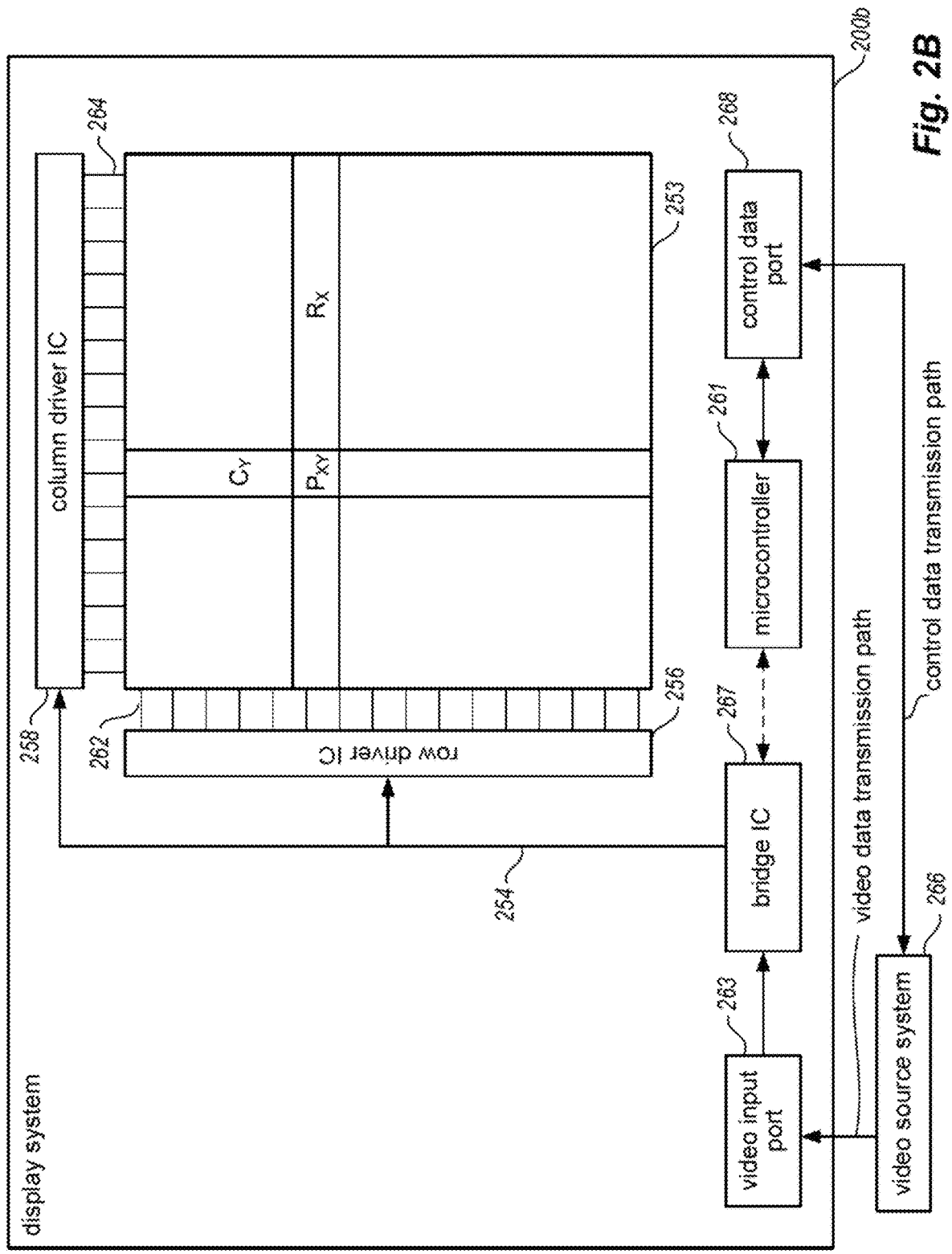
FIG. 2B is a schematic diagram illustrating example configured hardware circuitry of a display device for performing at least some techniques described in the present disclosure.

FIG. 2B illustrates one example of hardware circuitry on a display device (e.g., HMD device 200a of FIG. 2A and/or HMD device 380a of FIG. 3 and/or the HMD device discussed in the examples of FIGS. 1A-1I or otherwise discussed with respect to the described techniques), which may be configured to perform automated operations to receive and display image data on one or more display panels in accordance with the described techniques, as well as to provide timing delay information and/or tracking information for the HMD device to the image rendering system. In particular, FIG. 2B includes an example display system 200b that has a pixel array 253 in which a plurality of pixels P are arranged in rows R and columns C. Although only one example row (labeled $R_x$) and one example column (labeled $C_y$) are shown, and one example pixel (labeled $P_{xy}$) at their intersection is shown, in practice the pixel array 253 may be any desirable M×N array, where M is the number of rows and N is the number of columns in the pixel array. The display system 200b may be an LCD system or an OLED system, for example. In implementations where the display system 200b is a color display, the pixels P may comprise sub-pixels that each produces a different color (e.g., red, green, blue).

Adjacent the pixel array 253 of the display system 200b is a peripheral area which includes hardware circuitry for driving the individual pixels of the pixel array 253, as well as optionally performing other functions. In particular, the hardware circuitry include a row driver circuit (e.g., IC, or integrated circuit) 256, also referred to at times as a gate or scan driver circuit, and a column driver circuit (e.g., IC) 258, also referred to at times as a data driver circuit—the row driver circuit 256 and column driver circuit 258 may be collectively referred to herein as a "pixel driver subsystem." Each of the driver circuits 256 and 258 may be formed from one or more integrated circuits, for example. In practice, a video input port 263 (e.g., a DisplayPort port) receives image data input from an external video source system 266 (e.g., the image rendering system 335 of FIG. 3 or the image rendering system discussed with respect to the examples of FIGS. 1A-1I), optionally in an encoded form, and transmits the received data to a bridge IC 267. The bridge IC 267 is configured to implement logic to perform automated operations to decode the received data if encoded, and to forward respective information to the row and column driver circuits to implement the resulting pixel values. In particular, the row driver circuit 256 includes a plurality of row select lines 262, one for each of the rows R of pixels (or sub-pixels) in the pixel array 253, with each of row select lines 262 being electrically coupled to scan electrodes for the pixels in the corresponding row of the pixel array 253. The column driver circuit 258 similarly includes a plurality of data lines 264, one for each of the columns C of pixels (or sub-pixels) in the pixel array 253, with each of the data lines 264 being electrically coupled to data electrodes for the pixels in the corresponding column of the pixel array 253. The row driver circuit 256, under control of the bridge IC 267, selectively enables one or more rows of the pixel array 253 at a time via the row select lines 262, and the column driver circuit 258, under control of the bridge IC 267, outputs data (e.g., voltage levels) on the data lines 264 for each of the columns of pixels in the pixel array 253. Thus, the intensity of light transmitted by each pixel is determined by a drive voltage applied by the column driver circuit 258 to a pixel's data electrode via a data line 264 when the pixel's scan electrode is pulsed high by the row driver circuit 256 via a row select line 262. In at least some implementations the driver circuits 256 and 258 and/or the bridge IC 267 may be configured to simultaneously load multiple rows with the same data or similar data.

As previously noted, the bridge IC 267 is operatively coupled to a video source system 266 via the video input port 263, which feeds an image stream (e.g., processed video data) to the bridge IC 267 for display on the display system 200b. The video source system 266 may be any video output source system that utilizes the display system, such as a flat panel television, laptop, tablet computer, mobile phone, head mounted display, wearable computer, etc. The video source system 266 may be a component (e.g., graphics controller) of a larger system. The bridge IC 267 receives the image stream and converts it to the appropriate voltage programming information to be provided to the pixels in the pixel array 253 to sequentially display images present in the image stream. The bridge IC 267 may include a level shifter, timing, and analog functions generators, for example. Generally, the bridge IC 267 may generate timing and data signals for biasing the row and column driver circuits 256 and 258, by taking as input from the video source system 266 one or more of the image stream signals (e.g., digital signals), synchronization information, timing information, etc.

The display system 200b also includes a separate microcontroller 261 in the illustrated example, such as to generate and transmit information back to the video source system 266, although other embodiments may not include such a microcontroller as part of the display system 200b (e.g., if one or more such microcontrollers are part of one or more other systems of the display device, or instead are not implemented in a particular embodiment). In the illustrated embodiment, the microcontroller 261 is coupled to a control data port 268 (e.g., a USB port) via which bi-directional control data may be exchanged between the display system 200b and the video source system 266 (or other external system, not shown). For example, if the microcontroller 261 receives a timing packet transmission from the video source system via the control data port, such as in a manner analogous to a ping transmission, the microcontroller 261 immediately generates a timing response packet and sends it back to the video source system, such as to enable the video source system to determine the roundtrip latency in communications to and from the display system 200b along the control data transmission path. In other situations, a timing packet transmission may be received along the video data transmission path via video input port 263 (e.g., together with image data), in which case the bridge IC 267 may forward the timing packet transmission to the microcontroller 261 to generate and send a timing response while the bridge IC 267 is otherwise preparing the image data for display on the pixel array 253, such as for use in measuring the transmission time along the video data transmission path from the video source system 266 to the bridge IC 267. In addition, in some embodiments the microcontroller 261 may transmit further information to the video source system via the control data port 268, such as the most recent tracking information for the HMD device or other device that includes the display system 200b (e.g., location and/or orientation information for the display device on which the display system is implemented), although in other embodiments other components (not shown) of the HMD device or other display device may generate and/or transmit such tracking information. The information transmitted from the HMD device or other display device may further in other embodiments include, for example, wearer user pupil and/or gaze direction information, other status information for the HMD device or other display device (e.g., battery levels, IMU acceleration data, etc.), etc. The bridge IC 267 and/or microcontroller 261 may include memory, I/O interfaces, communications systems, etc., as well as one or more processors (e.g., one or more central processing units (CPUs), microprocessors, digital signal processors (DSPs), application-specific integrated circuits (ASICs), field programmable gate arrays (FPGAs), graphics processing units (GPUs), other programmable circuits, combinations of the above, etc.).

Figure 3:
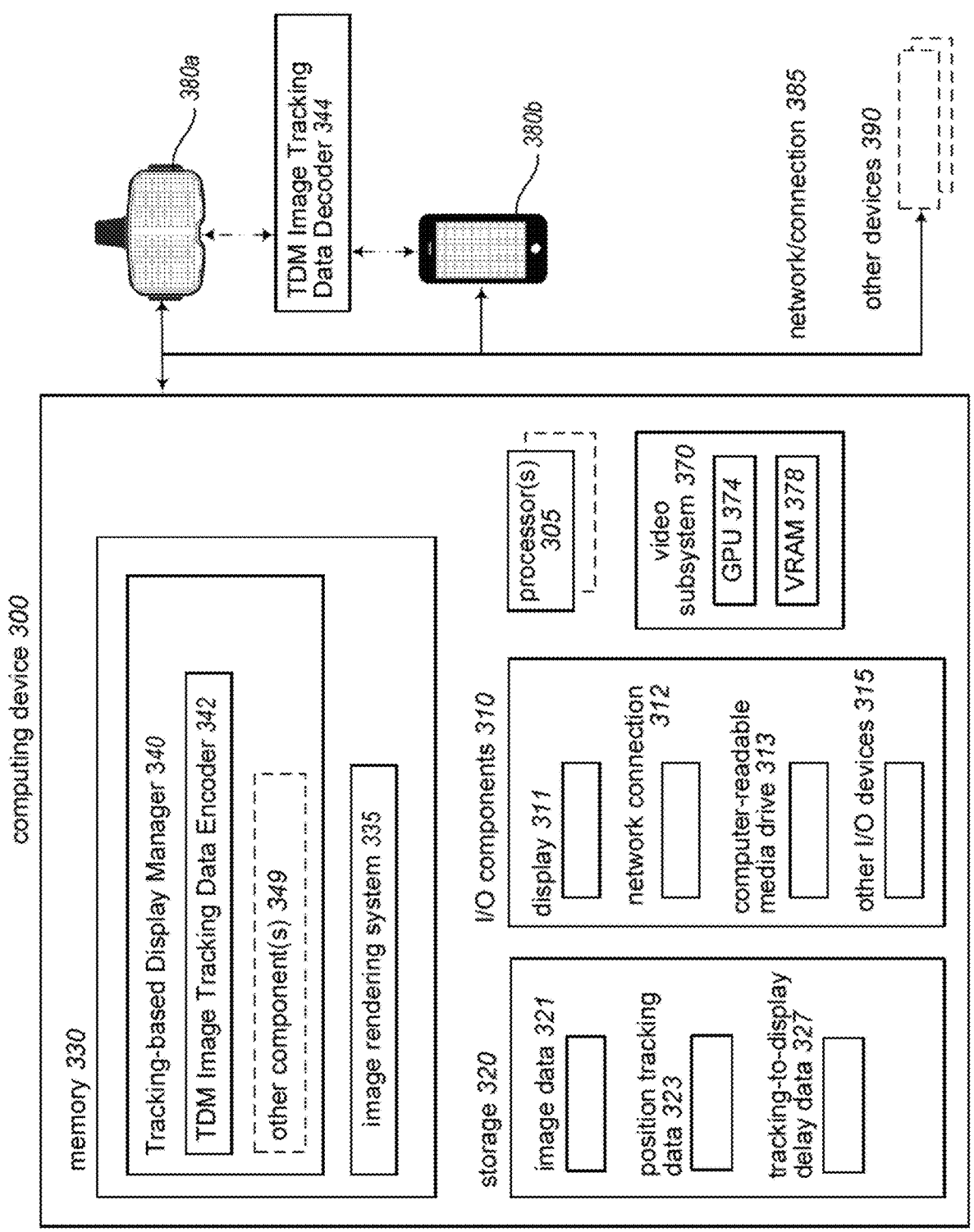
FIG. 3 is a block diagram illustrating example devices and systems for performing at least some of the described techniques, including an embodiment of a Tracking-based Display Manager ("TDM") system.

FIG. 3 is a block diagram illustrating example devices and systems for performing at least some of the described techniques. In particular, FIG. 3 includes one or more computing devices 300 that are suitable for performing at least some of the described techniques for generating and providing images of a simulated environment for display that include associated information about tracked positions of a display device to which the images correspond (e.g., one or more associated tracking-related times), such as by executing an embodiment of a Tracking-based Display Manager ("TDM") system 340. In addition, FIG. 3 also includes one or more display devices 380 on which the images may be displayed, such as under control of an Image Tracking Data Decoder component 344 of the TDM system that executes on electronic circuitry of the display devices or on one or more other associated computing devices (not shown). One or more optional other devices 390 are also illustrated, such as to assist in performing position tracking of one or more of the display devices 380, to provide images or other information for use by the image rendering system 335 and/or display devices 380, etc. The various devices are interconnected via one or more computer networks or other connections 385 (e.g., the Internet, one or more cellular telephone networks, a tether or other cable, a local wireless connection, etc.), including to enable communications between the computing systems, devices, and any other systems or components implemented on them.

The example computing device(s) 300 each includes one or more hardware processors 305 (e.g., one or more CPU, or central processing unit, processors, etc.), various input/output ("I/O") components 310, storage 320, and memory 330, as well as having a video subsystem 370 to manage display operations on the one or more display devices 380. The video subsystem 370 includes one or more GPUs (or graphic processing units) and associated VRAM (video RAM), such as to provide a high volume of video frame data (corresponding to high image resolution for each video frame, as well as a high "frame rate" of approximately 60-180 of such video frames per second) to implement a quality gaming or other image viewing experience, although in other embodiments a separate video subsystem may not be provided or used. Illustrated I/O components in this example embodiment include a display 311, a network connection 312, a computer-readable media drive 313, and other I/O devices 315 (e.g., keyboards, mice or other pointing devices, microphones, speakers, tactile output, handheld wireless or other controllers, an IR transmitter and/or receiver, other photo sensors, GPS receiver or other location-determination devices, pupil and/or gaze tracking components, etc.)—such I/O components may enable a variety of types of interaction types, including, for example, voice control, gesture control, etc. While various of the details illustrated with respect to the computing devices 300 are not illustrated with respect to the devices 350 or 390, the devices 350 and 390 may similarly include some or all of the same types of components as the computing devices 300, including for the display devices 380 to optionally include one or more processors or other electronic circuitry configured to execute an embodiment of the component 344. The devices 380 may further include additional components that are not illustrated with respect to device(s) 300, such as one or more optical lenses, a housing, sensors (e.g., an IMU), other I/O devices (e.g., one or more internal and/or external cameras, one or more speakers to provide sound to the ears of the wearer or other user, one or more pupil and/or gaze tracking systems, other types of movement sensors or other sensors, etc.). Similarly, if one or more of the other computing systems 390 operates in conjunction with one or more of the end-user devices 350, such as to provide motion tracking and/or image display capabilities, those other computing systems may similarly include additional components that are not illustrated with respect to device(s) 300.

In this example, at least some of a TDM system 340 is executing in memory 330 of the server computing device 300, along with an associated image rendering system 335 and optionally one or more other programs (not shown). As discussed in greater detail elsewhere herein, the TDM system 340 may perform at least some of the described techniques for generating and/or providing images that have associated tracking-related time information and/or other metadata, such as by a TDM Image Tracking Data Encoder routine 342. Such images and associated information may then be provided to one or more display devices 380 over one or more networks or other connections 390, such as to an HMD device 380a and/or to a handheld mobile display device 380b (e.g., a smart phone or laptop or tablet). As part of its operation, the system 340 may generate and/or use various stored data, such as on storage 320, including data 321 for use in generating images of a simulated environment (e.g., information about simulated objects in the simulated environment), data 323 about position tracking data for one or more of the display devices 380 (e.g., as received from the display devices and/or other devices 390), and data 327 about delay data for use in predicting or otherwise estimating future positions at future times that differ from a current time by a current delay. The image rendering system 335 may further store and use additional data on computing device 300 or elsewhere (e.g., on one of the other devices 390), such as for use in performing one or more games in embodiments in which the image rendering system is part of a game system, but those details are not illustrated in this example. While the TDM system 340 is implemented at least in part as a software system in this example, such as with corresponding software instructions that when executed program or otherwise configure the processor(s) 305 and/or 374 and the computing device(s) 300 to perform automated operations that implement at least some of the described techniques, it may be implemented in other manners in other embodiments.

It will be appreciated that, while the display devices 380a and/or 380b are depicted as being distinct and separate from the computing device 300 in the illustrated embodiment of FIG. 3, in certain embodiments some or all components of the illustrated devices may be integrated and/or housed within a single device, such as a mobile gaming device, portable VR entertainment system, etc. In such embodiments, networks/connections 385 may, for example, include one or more system bus and/or video bus architectures.

It will also be appreciated that the illustrated devices are merely illustrative and are not intended to limit the scope of the present invention. For example, computing device(s) 300 and/or other device(s) 380 and 390 may be connected to other devices that are not illustrated, including through one or more networks such as the Internet or via the Web. More generally, a computing system or device may comprise any combination of hardware that can interact and perform the described types of functionality, such as when programmed or otherwise configured with appropriate software, including without limitation desktop computers, laptop computers, slate computers, tablet computers or other computers, a gaming console or other dedicated gaming systems, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate intercommunication capabilities. For example, the illustrated system 340 may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity.

Thus, in at least some embodiments, the illustrated system is a software-based system including software instructions that, when executed by the processor(s) 305 and/or 374 and/or other processor means, program the processor(s) to automatically perform the described operations for that system. Furthermore, in some embodiments, some or all of the systems may be implemented or provided in other manners, such as at least partially in firmware and/or hardware means, including, but not limited to, one or more hardware processors or other configured hardware circuitry such as one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), digital signal processors (DSPs), programmable logic controllers (PLCs), etc. Some or all of the systems or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
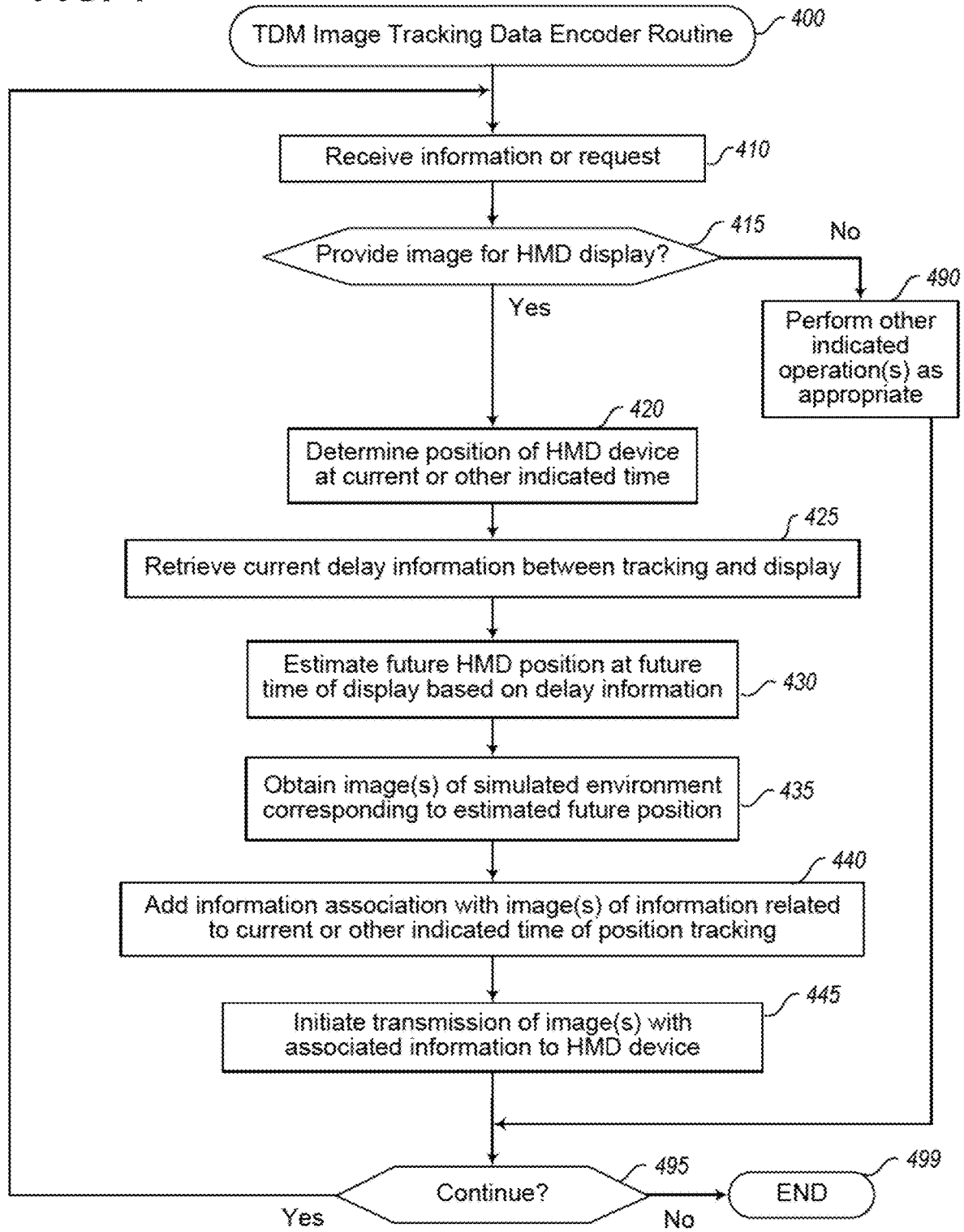
FIG. 4 is a flow diagram of an example embodiment of an Image Tracking Data Encoder routine of a TDM system.

FIG. 4 is a flow diagram of an example embodiment of an Image Tracking Data Encoder routine 400 of a TDM system. The routine may be provided by, for example, execution of component 342 of FIG. 3 and/or a component discussed with respect to corresponding functionality of example FIGS. 1A-1H, such as to provide images of a simulated environment for display on a display device with additional associated information about position tracking to which the images correspond (e.g., based on a time at which a tracked position is determined or other related time). While the illustrated embodiment discusses use of the described techniques with one or more HMD devices, it will be appreciated that the techniques may be used with other types of display devices in other embodiments. In addition, the example embodiment of the routine may operate in association with one or more image rendering systems (e.g., as part of such an image rendering system), such as image rendering system 335 of FIG. 3, with the image rendering system(s) generating or otherwise determining or selecting images to be displayed based on a most recent tracked position of the HMD device and/or an estimated future position of the HMD device, and the illustrated routine providing functionality related to using tracked position information and associated timing information as discussed below.

The illustrated embodiment of the routine begins at block 410, where information or a request is received. The routine continues to block 415 to determine if the information or request received in block 410 is an indication to provide an image for display on an associated HMD device. If so, the routine continues to block 420 to determine tracked position information for the HMD device at a current time (e.g., a most recent time for which the tracked position information is available) or other indicated time, such as based on information recently supplied from the HMD device and/or by actively tracking and monitoring the position of the HMD device (e.g., in association with a position tracking system operating in conjunction with the HMD device). After block 420, the routine continues to block 425 to retrieve information about a current estimate of an amount of time between generation of an image for display by the routine 400 and actual display of the image on the HMD device, such as a default time or most recently determined actual delay time between when position tracking information is determined and/or used in image generation and a later display of the image(s). In block 410, the routine then predicts a future position of the HMD device at a future time that corresponds to a difference from the current or other indicated time based on the retrieved current delay time for display, such as by adding the delay time to the current or other indicated time.

In block 435, the routine then obtains one or more images of a simulated environment for display on the HMD device that correspond to the predicted future position of the HMD device for the future time, such as by interacting with a separate gaming system or other image rendering system that produces the images (e.g., by providing information about the estimated future position and receiving one or more corresponding images). In block 440, the routine then optionally adds information in association with the obtained image(s) about the current or other indicated time, as well as to optionally include other information if appropriate. As discussed in greater detail elsewhere, the associated information may be stored, for example, in the header of the image or in other metadata associated with the image. After block 440, the routine continues to block 445 to initiate transmission of the one or more images to the HMD device for display along with the associated information.

If it is instead determined in block 415 that the information or request received in block 410 is not to provide an image, the routine continues to block 490 to perform one or more other indicated operations as appropriate. Such other operations may include, for example, one or more of the following: receiving and storing actual delay information from the HMD device based on one or more previously transmitted images, such as for later use in block 425; receiving and storing current tracked position information for the HMD device, such as for later use in block 420; receiving information from the HMD device that safe mode operation is initiated, and optionally providing the information to the image rendering system; etc.

After blocks 445 or 490, the routine continues to block 495 to determine whether to continue, such as to continue until an explicit indication to terminate is received. If it is determined to continue, the routine returns to block 410, and otherwise continues to block 499 and ends.

Figure 5:
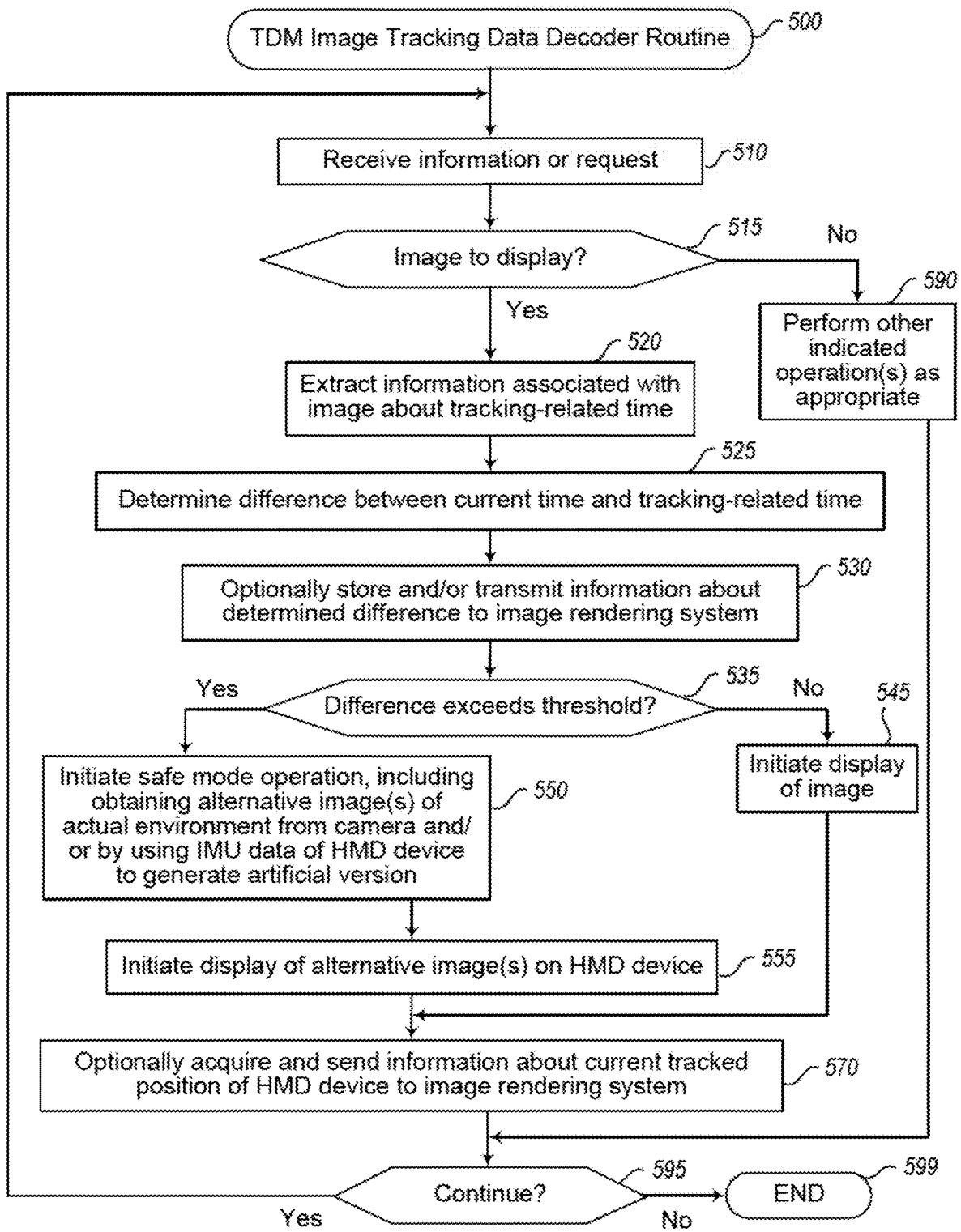
FIG. 5 is a flow diagram of an example embodiment of an Image Tracking Data Decoder routine of a TDM system.

FIG. 5 is a flow diagram of an Image Tracking Data Decoder routine 500 of a TDM system. The routine may be performed by, for example, execution of component 344 of FIG. 3 and/or a component discussed with respect to corresponding functionality of example FIGS. 1A-1H, such as to receive images of a simulated environment for display on a display device with additional associated information about position tracking to which the images correspond (e.g., based on a time at which a tracked position is determined or other related time), and to determine a delay to a current time of display for use in later generation of additional images and/or for use in determining whether the images cause the display device to initiate safe mode operation. While the illustrated embodiment discusses use of the described techniques with one or more HMD devices, it will be appreciated that the described techniques may be used with other types of display devices in other embodiments. In addition, the example embodiment of the routine may operate in association with other image processing and display circuitry of a display device or associated computing system, with the routine determine whether to display the received images of the simulated environment or to otherwise obtain and display one or more alternative images, and with the other image processing and display circuitry performing the actual display operations.

The illustrated embodiment of the routine begins at block 510, where information or a request is received. The routine continues to block 515 to determine if an image to be displayed on the HMD device is received, and if so continues to block 520 to extract information associated with the image about a current or other indicated time for a tracked position of the HMD device to which the image corresponds.

In block 525, a difference is determined between the current time and the extracted tracking-related time, and in block 530 the routine optionally stores and/or transmits information about the determined actual time difference to an image rendering system and/or the routine 400 of FIG. 4 (e.g., to a source of the received image), such as for use as delay information during future image generation. After block 530, the routine continues to block 535 to determine if the determined difference in time exceeds a defined threshold, and if not the routine continues to block 545 to initiate display of the image received in block 510.

Otherwise, if it is determined in block 535 that the difference does exceed the defined threshold (or that other criteria are satisfied in other embodiments of the routine), the routine continues instead to block 550 to initiate safe-mode operation of the HMD device, including to obtain one or more alternative images to display on the HMD device, such as to provide information about the actual physical environment around the user and HMD device. As discussed in greater detail elsewhere, an alternative image may be, for example, an image acquired from a camera on the HMD device or other device in the actual physical environment, such as to show the user an actual position of the user in the physical environment, and/or may be an artificial version of the actual physical environment that is generated based, for example, at least in part on orientation information for the HMD device that is determined using one or more sensors on the HMD device (e.g., inertial measurement unit data). In addition, the initiation of the safe-mode operation may include performing other operations in at least some embodiments, such as to otherwise warn or notify the user, to pause the operation of the image rendering system in generating additional images (e.g., by transmitting information about the safe mode operations to the image rendering system and/or to routine 400), etc. After block 550, the routine continues to block 555 to initiate display of the alternative image(s) on the HMD device.

After blocks 545 or 555, the routine continues to block 570 to optionally acquire and/or send current tracked position information for the HMD device to the image rendering system (e.g., based on tracking performed by the HMD device and/or by other devices in the actual physical environment), such as for use in later image generation that corresponds to that tracked position information.

If it is instead determined in block 515 that the information or request received in block 510 is not to display an image, the routine continues instead to block 590 to perform one or more other indicated operations as appropriate. For example, such other operations may include one or more of the following: providing current or recent delay information to a requester and/or routine 400 and/or other entity (e.g., in response to a request, by pushing the information periodically or when other criteria are satisfied, etc.); providing tracked position information for the HMD device to an image rendering system and/or routine 400 (e.g., in response to a request, periodically or otherwise when one or more indicated criteria are satisfied, etc.); providing information about initiating or ending safe mode operation to a requester and/or routine 400 and/or other entity (e.g., in response to a request, by pushing the information periodically or when other criteria are satisfied, etc.); determining to end a previously initiated safe mode operation when one or more associated criteria are satisfied, such as after a defined period of time or when additional images are received whose determined delay information does not exceed the threshold (or otherwise satisfy other criteria in other embodiments); etc.

After blocks 570 or 590, the routine continues to block 595 to determine whether to continue, such as until an explicit indication to terminate is received. If it is determined to continue, the routine returns to block 510, and otherwise continues to block 599 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

In addition, the sizes and relative positions of elements in the drawings are not necessarily drawn to scale, including the shapes of various elements and angles, with some elements enlarged and positioned to improve drawing legibility, and the particular shapes of at least some elements being selected for ease of recognition without conveying information regarding the actual shape or scale of those elements. In addition, some elements may be omitted for clarity and emphasis. Furthermore, repeated reference numbers in different drawings may signify the same or similar elements.

From the foregoing it will be appreciated that, although specific embodiments have been described herein for purposes of illustration, various modifications may be made without deviating from the spirit and scope of the invention. In addition, while certain aspects of the invention are presented at times in certain claim forms, or may not be embodied in any claims at some times, the inventors contemplate the various aspects of the invention in any available claim form. For example, while only some aspects of the invention may be recited at a particular time as being embodied in a computer-readable medium, other aspects may likewise be so embodied.

What is claimed is:

1. A method comprising:
  receiving, by one or more configured hardware circuits and for display on a head-mounted display device, one or more images of a simulated environment that are generated using a tracked position of the head-mounted display device in a surrounding actual environment at a first time and that have associated information corresponding to the first time;
  determining, by the one or more configured hardware circuits, and after receiving the one or more images but before displaying the received one or more images on the head-mounted display device, that a difference between a current time and the first time exceeds a defined threshold; and initiating, by the one or more configured hardware circuits, and in response to the determining that the difference exceeds the defined threshold, a safe-mode operation of the head-mounted display device to protect ongoing use, including displaying one or more other images on the head-mounted display device that represent the surrounding actual environment instead of displaying the received one or more images of the simulated environment.

2. The method of claim 1 further comprising:

generating, by one or more hardware processors that implement an image rendering system, the one or more images of the simulated environment, including:
  identifying the tracked position of the head-mounted display device at the first time;
  estimating a future position of the head-mounted display device at a future time, wherein the future time differs from the first time by an estimated latency between the generating of the one or more images and subsequent displaying of the one or more images on the head-mounted display device; and
  producing the one or more images to include a view of the simulated environment that is based on the estimated future position; and
sending, by the one or more hardware processors, the one or more images over one or more network connections to the head-mounted display device for display.

3. The method of claim 2 further comprising:

sending, by the one or more configured hardware circuits, information about the determined difference between the current time and the first time over the one or more network connections to the image rendering system, for use by the image rendering system in generating additional images for display on the head-mounted display device that are based at least in part on the determined difference;

receiving, by the one or more hardware processors, the sent information about the determined difference between the current time and the first time;

changing, by the one or more hardware processors, the estimated latency based at least in part on the determined difference between the current time and the first time;

estimating one or more additional future positions of the head-mounted display device at one or more additional future times that differ from a current time by the changed estimated latency;

generating, by the one or more hardware processors, one or more additional images of the simulated environment to include one or more views of the simulated environment based on the estimated one or more additional future positions; and sending, by the one or more hardware processors, the one or more additional images over the one or more network connections to the head-mounted display device for display.

4. The method of claim 2 wherein the generating of the one or more images occurs after the first time and further includes adding timestamp data to the one or more images to provide the one or more configured hardware circuits with the associated information corresponding to the first time, and wherein the added timestamp data indicates at least one of the first time, or the future time differing from the first time by the estimated latency, or a time of the generating of the one or more images after the first time.

5. The method of claim 2 further comprising tracking, by the one or more configured hardware circuits, the position of the head-mounted display device in the surrounding actual environment at multiple times as a user wearing the head-mounted display device moves within the surrounding actual environment, and supplying information from the tracking over the one or more network connections to the image rendering system, wherein the supplied information includes the tracked position of the head-mounted display device at the first time and indicates a location of the head-mounted display device at the first time in a three-dimensional space in which the user is located.

6. The method of claim 5 wherein the tracking of the position of the head-mounted display device in the surrounding actual environment further includes determining orientation of the head-mounted display device along three axes, and wherein the supplying of the information further includes indicating an orientation at the first time of the head-mounted display device along the three axes while at the location in the three-dimensional space.

7. The method of claim 1 wherein the initiating of the safe-mode operation further includes providing one or more notifications to a user wearing the head-mounted display device to cause the user to stop moving during the safe-mode operation.

8. The method of claim 1 further comprising obtaining the one or more other images by using a camera on the head-mounted display device to acquire images of the surrounding actual environment.

9. The method of claim 1 further comprising obtaining the one or more other images by using one or more inertial measurement units on the head-mounted display device to acquire additional information about a current orientation of the head-mounted display device, and generating the one or more other images to provide information indicating one or more elements of the surrounding actual environment based at least in part on the additional information about the current orientation.

10. The method of claim 1 wherein the one or more configured hardware circuits include at least one hardware processor that is part of a display system for the head-mounted display device, and wherein the receiving of the one or more images includes receiving the one or more images over at least one network connection from an image rendering system that generates the one or more images.

11. The method of claim 10 wherein the one or more configured hardware circuits further include at least one hardware processor that is part of a gaming system, and wherein the received one or more images are each a frame of video generated by an executing game program for the gaming system that includes the image rendering system.

12. A system, comprising:

one or more display panels of a head-mounted display device; and one or more hardware circuits configured to cause the system to perform automated operations that include at least:
  receiving one or more images for display on the one or more display panels of the head-mounted display device, the one or more images being generated, by an image rendering system, of a simulated environment using a tracked position of the head-mounted display device in a surrounding actual environment at a first time and having associated information corresponding to the first time;

at a current time, processing the associated information corresponding to the first time at which the one or more images were generated to determine a difference between the current time and the first time, and sending information regarding the determined difference between the current time and the first time for use by the image rendering system;

responsive to determining that the difference between the current time and the first time exceeds a defined threshold, initiating changes to operation of the head-mounted display device; and responsive to determining that the difference between the current time and the first time does not exceed the defined threshold, initiating display of the received one or more images on the one or more display panels of the head-mounted display device without the changes to the operation.

13. The system of claim 12 further comprising one or more memories with stored instructions that, upon execution by at least one of the one or more configured hardware circuits, cause the system to perform at least some of the automated operations.

14. The system of claim 12 further comprising a computing device that is separated from the head-mounted display device by at least one network connection and that is configured to execute the image rendering system, wherein the image rendering system includes a software application to receive the sent information regarding the determined difference and to generate a sequence of multiple video frames for display on the head-mounted display device that includes at least one video frame generated based on the sent information, wherein the received one or more images are each one of the multiple video frames, and wherein the receiving and the determining and the sending are performed for each of the multiple video frames.

15. The system of claim 12 wherein the automated operations include determining that the difference exceeds a defined threshold, and wherein the initiating of the changes to the operation of the head-mounted display device includes initiating a safe-mode operation of the head-mounted display device that displays one or more other images on the head-mounted display device representing the surrounding actual environment instead of displaying the received one or more images.

16. The system of claim 12 wherein the automated operations include determining that the difference exceeds a defined threshold, and wherein the initiating of the changes to the operation of the head-mounted display device includes at least one of changing generation of additional images by the image rendering system for display on the head-mounted display device to correspond to the determined difference or providing a notification to a user of the head-mounted display device based on the determined difference.

17. The system of claim 12 further comprising a video input port via which the one or more images are received, and a control data port via which the system receives one or more additional timing packets from the image rendering system, and wherein the one or more configured hardware circuits include a microcontroller that is configured to respond, immediately upon receipt of the one or more additional timing packets, by sending at least one timing response packet to the image rendering system via the control data port to cause the image rendering system to receive timing information from a delay between sending the one or more additional timing packets and receiving the at least one timing response packet.

18. A method comprising:
tracking, by one or more configured hardware circuits, a position of a head-mounted display device as a user wearing the head-mounted display device moves within a surrounding physical environment;

supplying, by the one or more configured hardware circuits, tracking information from the tracking to an image rendering system that generates images of a simulated environment based on the position of the head-mounted display device;

receiving, by the one or more configured hardware circuits, an image generated by the image rendering system for display on the head-mounted display device, wherein the received image includes information indicating a first time and provides a view of the simulated environment from a first position of the head-mounted display device at the first time and is generated using data in the supplied tracking information indicating the first position at the first time;

determining, by the one or more configured hardware circuits, and after receiving the image but before displaying the received image on the head-mounted display device, a difference between a current time and the first time; and initiating, by the one or more configured hardware circuits, and in response to the determined difference exceeding a defined threshold, a safe-mode operation of the head-mounted display device to protect the user during continued movement within the surrounding physical environment, including:
obtaining one or more other images of the surrounding physical environment using one or more sensors on the head-mounted display device; and
displaying, on the head-mounted display device and instead of the received image providing the view of the simulated environment from the first position, the obtained one or more other images of the surrounding physical environment.

19. The method of claim 18 further comprising:
sending, by the one or more configured hardware circuits, information to the image rendering system regarding the determined difference for use in, as part of generating at a second time one or more additional images for display on the head-mounted display device, predicting a new position of the user at a future third time that differs from the second time by an amount based at least in part on the determined distance, to cause the generated one or more additional images to correspond to the predicted new position of the user at the future third time;

receiving, by the one or more configured hardware circuits, the one or more additional images; and displaying, by the one or more configured hardware circuits, the one or more additional images on the head-mounted display device.

20. The method of claim 19 wherein the image rendering system includes a software application generating a sequence of multiple video frames for display on the head-mounted display device to present the user with a changing portion of the simulated environment that corresponds to a changing position of the head-mounted display device, and wherein the receiving and the determining are performed for each of the multiple video frames.

21. The method of claim 18 wherein the obtaining of the one or more other images of the surrounding physical environment includes using a forward-facing camera on an exterior of the head-mounted display device to acquire the one or more other images.

22. The method of claim 18 wherein the obtaining of the one or more other images of the surrounding physical environment includes using one or more inertial measurement units on the head-mounted display device to acquire additional information about a current orientation of the head-mounted display device, and generating the one or more other images to provide information indicating one or more barriers in front of the user for the surrounding physical environment based at least in part on the additional information about the current orientation.

23. A system, comprising:
   one or more hardware processors; and
   one or more memories with stored instructions that, when executed by at least one of the one or more hardware processors, cause the system to perform automated operations that include implementing functionality of an image rendering system by:
      sending one or more timing packets to a head-mounted display device to cause configured hardware circuits on the head-mounted display device to, immediately upon receipt of the one or more timing packets, send at least one timing response packet back to the system;
      receiving the at least one timing response packet sent from the head-mounted display device, and determining a latency for communications from the image rendering system to the head-mounted display device based at least in part on an amount of time between the sending of the one or more timing packets and the receiving of the at least one timing response packet;
      generating, at a first time, one or more images for display on one or more display panels of the head-mounted display device at a second time that differs from the first time in an amount based on the determined latency; and
      transmitting the generated one or more images to the head-mounted display device, to cause display at the second time of the generated one or more images on the one or more display panels of the head-mounted display device.

24. The system of claim 23 wherein the stored instructions further cause to the system to:
   receive, after the transmitting of the generated one or more images, additional information from the head-mounted display device to indicate a difference between the second time and an actual time of display of the generated one or more images on the one or more display panels of the head-mounted display device;
   modify the determined latency to reflect the indicated difference between the second time and the actual time of display;
   generate, at a third time after modifying the determined latency, one or more additional images for display on the one or more display panels of the head-mounted display device at a fourth time that differs from the third time in an amount based on the modified determined latency; and
   transmit the generated one or more additional images to the head-mounted display device, to cause display at the fourth time of the generated one or more additional images on the one or more display panels of the head-mounted display device.

\* \* \* \* \*